(12) United States Patent
Okamura et al.

(10) Patent No.: US 7,697,730 B2
(45) Date of Patent: Apr. 13, 2010

(54) GUIDANCE SCREEN CONTROL METHOD OF BIOMETRICS AUTHENTICATION DEVICE, BIOMETRICS AUTHENTICATION DEVICE, AND PROGRAM FOR SAME

(75) Inventors: Sagiri Okamura, Inagi (JP); Kiyotaka Awatsu, Inagi (JP); Yasuhiko Mita, Inagi (JP); Takahiro Kudo, Maebashi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1011 days.

(21) Appl. No.: 11/076,539

(22) Filed: Mar. 10, 2005

(65) Prior Publication Data

US 2006/0023919 A1 Feb. 2, 2006

(30) Foreign Application Priority Data

Jul. 30, 2004 (JP) .............................. 2004-224270

(51) Int. Cl.
*G06K 9/00* (2006.01)
(52) U.S. Cl. ..................................................... 382/115
(58) Field of Classification Search .................. 382/115
See application file for complete search history.

(56) References Cited

U.S. PATENT DOCUMENTS

| 2001/0026632 | A1* | 10/2001 | Tamai ......................... 382/116 |
| 2003/0039380 | A1* | 2/2003 | Sukegawa et al. ........... 382/118 |
| 2003/0072474 | A1 | 4/2003 | Kies |
| 2004/0022421 | A1 | 2/2004 | Endoh et al. |
| 2004/0062423 | A1 | 4/2004 | Doi |

FOREIGN PATENT DOCUMENTS

| EP | 1 291 807 A2 | 3/2003 |
| EP | 1 416 427 A2 | 5/2004 |
| JP | 2000-293643 | 10/2000 |
| JP | 2004-49705 | 2/2004 |
| JP | 2004-62826 | 2/2004 |
| JP | 2004-78791 | 3/2004 |
| JP | 2004-297223 | 10/2004 |
| WO | WO 03/063054 A2 | 7/2003 |
| WO | WO 03/063054 A3 | 7/2003 |
| WO | WO-2004/084140 A1 | 9/2004 |

OTHER PUBLICATIONS

European Search Report dated Jul. 11, 2007, issued in corresponding European Patent Application No. 05 25 1756.

* cited by examiner

*Primary Examiner*—Wenpeng Chen
(74) *Attorney, Agent, or Firm*—Westerman, Hattori, Daniels & Adrian, LLP

(57) ABSTRACT

In a biometrics authentication device which uses biometrics information to authenticate individuals, guidance is provided such that image capture of biometrics information is performed appropriately. An image capture device is caused to perform a plurality of image capture operations (including distance measurement) at short intervals. And when image capture NG occurs frequently, a control unit stacks the NG results, and if image capture NGs are not resolved even after a prescribed number of image capture operations, judges that the relation between the body part and the image capture device must be corrected, analyzes the stacked image capture NG causes, and displays a guidance screen on a display device according to the analysis result.

20 Claims, 24 Drawing Sheets

REGISTERED IMAGE　　VERIFICATION IMAGE

REGISTERED IMAGE　　VERIFICATION IMAGE

US 7,697,730 B2

GUIDANCE SCREEN CONTROL METHOD OF BIOMETRICS AUTHENTICATION DEVICE, BIOMETRICS AUTHENTICATION DEVICE, AND PROGRAM FOR SAME

CROSS-REFERENCE TO RELATED APPLICATIONS

This application is based upon and claims the benefit of priority from the prior Japanese Patent Application No. 2004-224270, filed on Jul. 30, 2004, the entire contents of which are incorporated herein by reference.

BACKGROUND OF THE INVENTION

1. Field of the Invention

This invention relates to a guidance screen control method of a biometrics authentication device, to a biometrics authentication device, and to a program for same, which utilizes the biometrics characteristics of a portion of the body of a human to perform individual authentication, and in particular relates to a guidance screen control method of a biometrics authentication device, to a biometrics authentication device, and to a program for same, which, at the time of detection of biometrics information, provides guidance for the living body for detection in the range of detection, to perform verification against registered biometrics information.

2. Description of the Related Art

There exist numerous regions of the human body which can be used to differentiate individuals, among them fingerprints and toe-prints, the retina of the eyes, facial features, and blood vessel patterns. Advances in biometrics technology in recent years have been accompanied by proposals of various devices which identify biometrics characteristics which are such regions of the human body to authenticate individuals.

For example, because blood vessels in the palms and fingers and palm-prints provide a comparatively large quantity of individual characteristic data, they are suited to individual authentication where high reliability is required. In particular, the patterns of blood vessels (veins) remain unchanged from the fetus throughout life, and are thought to be completely unique, and so are suited to individual authentication. FIG. 25 through FIG. 28 explain conventional technology for authentication using the palm. As shown in FIG. 25, at the time of registration or authentication, the user brings the palm of a hand 110 close to an image capture device 100. The image capture device 100 emits near-infrared rays, which are incident on the palm of the hand 110. The image capture device 100 receives the near-infrared rays reflected from the palm of the hand 110 using a sensor.

As shown in FIG. 26, hemoglobin within the red corpuscles flowing in the veins 112 has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

As shown in FIG. 25, a user first registers in a server and card the vein image data for the palm of his own hand, using the image capture device 100. Next, in order to perform individual authentication, the user uses the image capture device 100 of FIG. 25 to cause the vein image data of his own palm to be read.

The individual is authenticated by comparing the patterns of veins in the registered vein image retrieved using the user's ID and in the vein verification image read by the image capture device 100. For example, on comparing the vein patterns in the registered image and a verification image as in FIG. 27, the individual is authenticated as the individual in question. On the other hand, upon comparison of the vein patterns in a registered image and in a verification image as in FIG. 28, the individual is not authenticated (see for example Japanese Patent Laid-open No. 2004-062826).

In such non-contact detection of biometrics information, the living body can move freely relative to the image capture device 100, and in particular the hand can move freely. On the other hand, the portion 100 for detection of the body must be positioned within the image capture range of the image capture device 100 to enable accurate detection. Methods to achieve this have been proposed in which, each time an image is captured, the position and orientation of the hand is detected, and when accurate image capture is not possible, a display or voice output is employed to convey the inappropriateness of the position or orientation of the hand (see for example WO 04/021884). By means of this method, because detection is contact-free, accurate detection of biometrics information is possible even when there is no sense of resistance to the hand or body during detection.

In this detection of biometrics information, the body, and in particular the hand moves freely. In order to perform rapid biometrics authentication, however, it is necessary to perform image capture frequently, detect appropriate images, and output these to the authentication process. Hence even if, as a consequence of the image capture state at each image capture, a display is presented indicating that the body part position or orientation is inappropriate, there is the possibility that the display may change in a short period of time, causing the user to be confused.

Similarly, because the display switches instantaneously, the screen may appear to the user to be flickering, so that again the display is not used effectively to guide the user.

SUMMARY OF THE INVENTION

Hence one object of this invention is to provide a guidance screen control method of a biometrics authentication device, a biometrics authentication device, and a program for same, to effectively guide the body part of the user to be detected, which can move freely, within the range of image capture of the image capture device.

Another object of the invention is to provide a guidance screen control method of a biometrics authentication device, a biometrics authentication device, and a program for same, to guide the body part into the range of image capture of the image capture device and shorten the time required for image capture, even if the body part moves freely, without causing the user to be confused.

Still another object of the invention is to provide a guidance screen control method of a biometrics authentication device, a biometrics authentication device, and a program for same, to guide the body part into the range of image capture, even when the image capture device performs image capture frequently, without causing the user to be confused.

In order to attain these objects, a biometrics authentication device of this invention detects biometrics characteristic data from a body part and registers the data when registering, and captures an image of the above body part, detects the above biometrics characteristic data from the above captured image, and verifies this against the above registered characteristic data when verifying, and authenticates the individual. The authentication device has an image capture device which captures images of the above body part, a display device which displays screens to provide guidance to the user for operation of the above image capture device, and a control unit which operates image capture of the above image capture device, detects the above biometrics characteristic data from the above captured images of body parts, and verifies this against the above registered characteristic data. And the above control unit judges, from the output of image capture operation of the above image capture device, whether the above image capture has been successful, temporarily stores the cause of an unsuccessful image capture, and, when image capture is not successful even after operation of the above image capture device a prescribed number of times, analyzes the temporarily stored causes, and displays a guidance screen on the above display device according to the results of the above analysis.

A guidance screen control method of this invention is a guidance screen control method of a biometrics authentication device in which biometrics characteristic data from a body part is detected and registered, an image of the above body part is captured, the above biometrics characteristic data is detected from the captured image and is verified against the above registered characteristic data to authenticate the user. The method has a step of judging, from the output of image capture operation of the image capture device which captures the image of the body part, whether the image capture has been successful; a step of temporarily storing the cause of an unsuccessful image capture; a step, when image capture is unsuccessful even after a prescribed number of image capture operations of the above image capture device, of analyzing the above causes stored temporarily; and a step of displaying a guidance screen according to the above analysis results on a display device.

A program of this invention causes a computer to execute a step of judging, from the output of image capture operation of the image capture device which captures the image of the body part, whether the image capture has been successful; a step of temporarily storing the cause of an unsuccessful image capture; a step, when image capture is unsuccessful even after a prescribed number of image capture operations of the above image capture device, of analyzing the above causes stored temporarily; and a step of displaying a guidance screen according to the above analysis results on a display device.

In this invention, it is preferable that the above control unit display on the above display device a guidance screen according to statistical information for the above temporarily stored causes.

In this invention, it is preferable that the above image capture device have an image capture sensor and a distance sensor which measures the distance from the above body part, and that the above control unit detect shifts in position of the above image capture sensor and the body part and shifts in distance between the above image capture sensor and the body part, and judge whether the above image capture operation has been successful.

In this invention, it is preferable that the above control unit classify causes of unsuccessful image capture as shifts in position or shifts in distance, and selectively display, on the above display device, a guidance screen for a shift in position or a guidance screen for a shift in distance, according to the classification result.

In this invention, it is preferable that the above control unit display on the above display screen a screen indicating the order of operation of the above image capture device prior to the initiation of the above image capture.

In this invention, it is preferable that, when the above verification result is not satisfactory, the above control unit, after displaying on the above display device a screen to repeat operation, initiates image capture operation of the above image capture device.

In this invention, it is preferable that the above image capture device have at least an image capture sensor, and that the above control unit detect shifts in position of the above image capture sensor and the body part, judge whether an image capture operation has been successful, classify the causes of unsuccessful image captures according to the direction of the shift in position, and display, on the above display device, a guidance screen indicating the direction of the shift in position according to the classification result.

In this invention, it is preferable that the characteristic pattern of the body part be a blood vessel image pattern of the body part.

In this invention, it is preferable that the above control unit display, as the above guidance screens, text indicating the above analysis result and an image indicating the appropriate positional relation of the body part to the above image capture device.

In this invention, when image capture (including distance measurement) is performed a plurality of times at short intervals and image capture NG occurs frequently, these are stacked for future use, and if after a prescribed number of image captures, the problem of image capture NG is still not eliminated, it is judged that the relation between the body part and the sensor must be corrected, the stacked image capture NG causes are analyzed, and screen guidance is provided according to the results of analysis of the relation between the body part and sensor.

Hence because the guidance screen does not change frequently, the user can fully comprehend the cause and can change the position of the body part relative to the sensor. By this means, confusion on the part of the user is prevented, the body part can be moved quickly to an appropriate position and distance relative to the sensor, and the speed of authentication can be increased. Further, because the cause resulting in the greatest number of image capture NGs is selected and a screen indicating this cause is presented, causes resulting in only occasional image capture NGs can be excluded, and the user can be guided more reliably.

DESCRIPTION OF THE PREFERRED EMBODIMENTS

Below, embodiments of the invention are explained in the order of a biometrics authentication system, biometrics authentication processing method, guidance screen control method, and other embodiments.

Biometrics Authentication System

Figure 1:
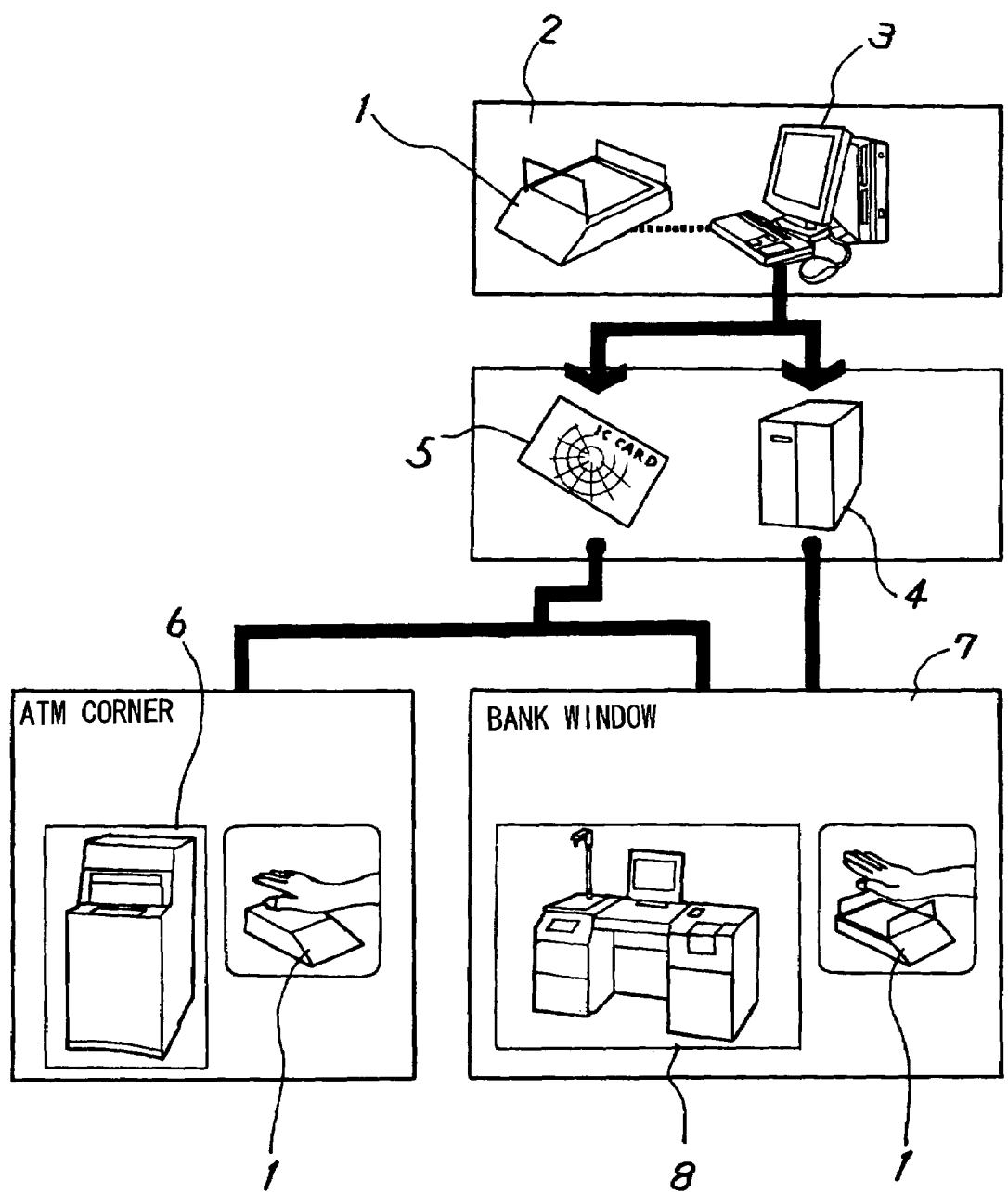
FIG. 1 shows the configuration of a biometrics authentication system of one embodiment of the invention.
Figure 2:
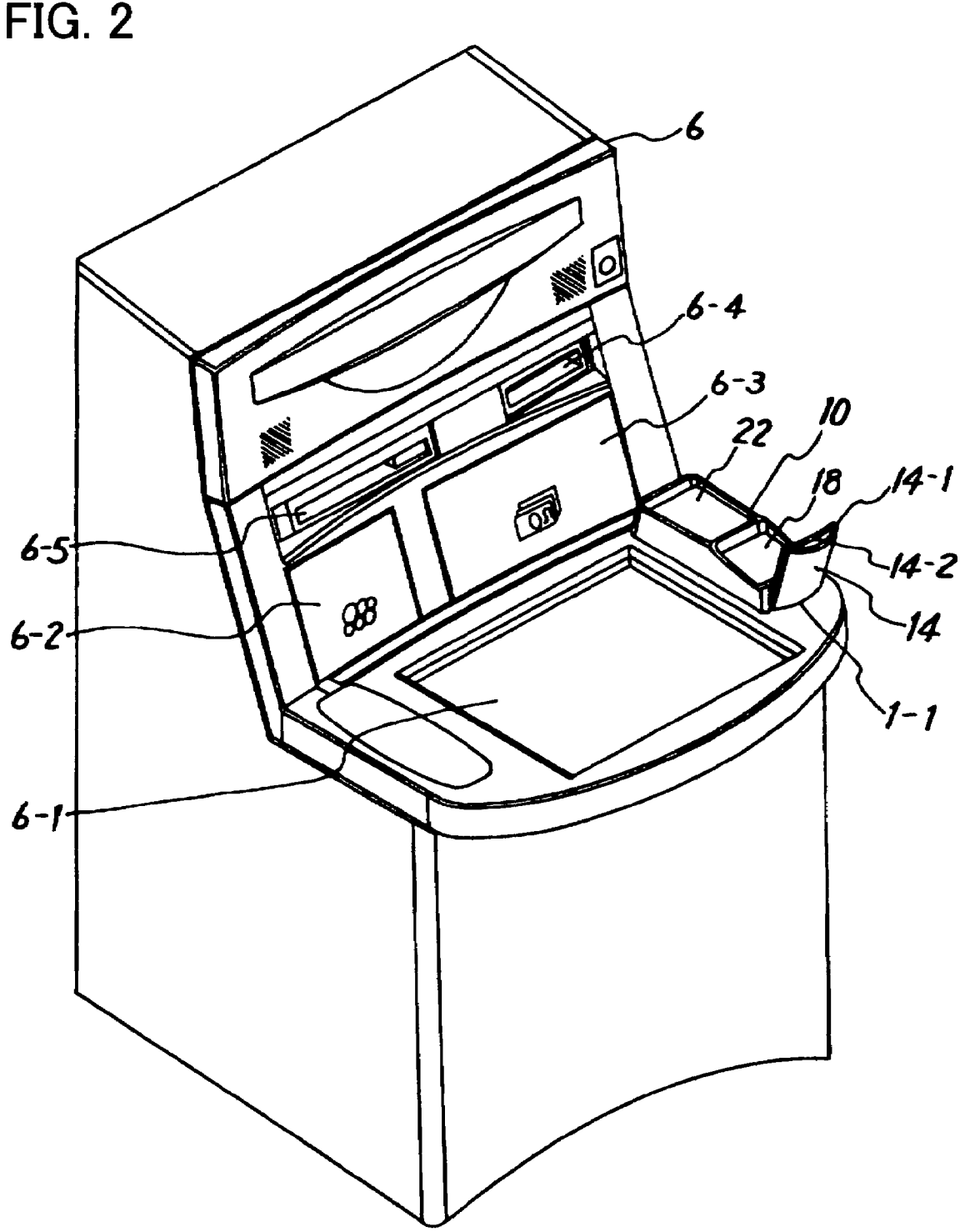
FIG. 2 is a perspective view of the ATM of FIG. 1.
Figure 3:
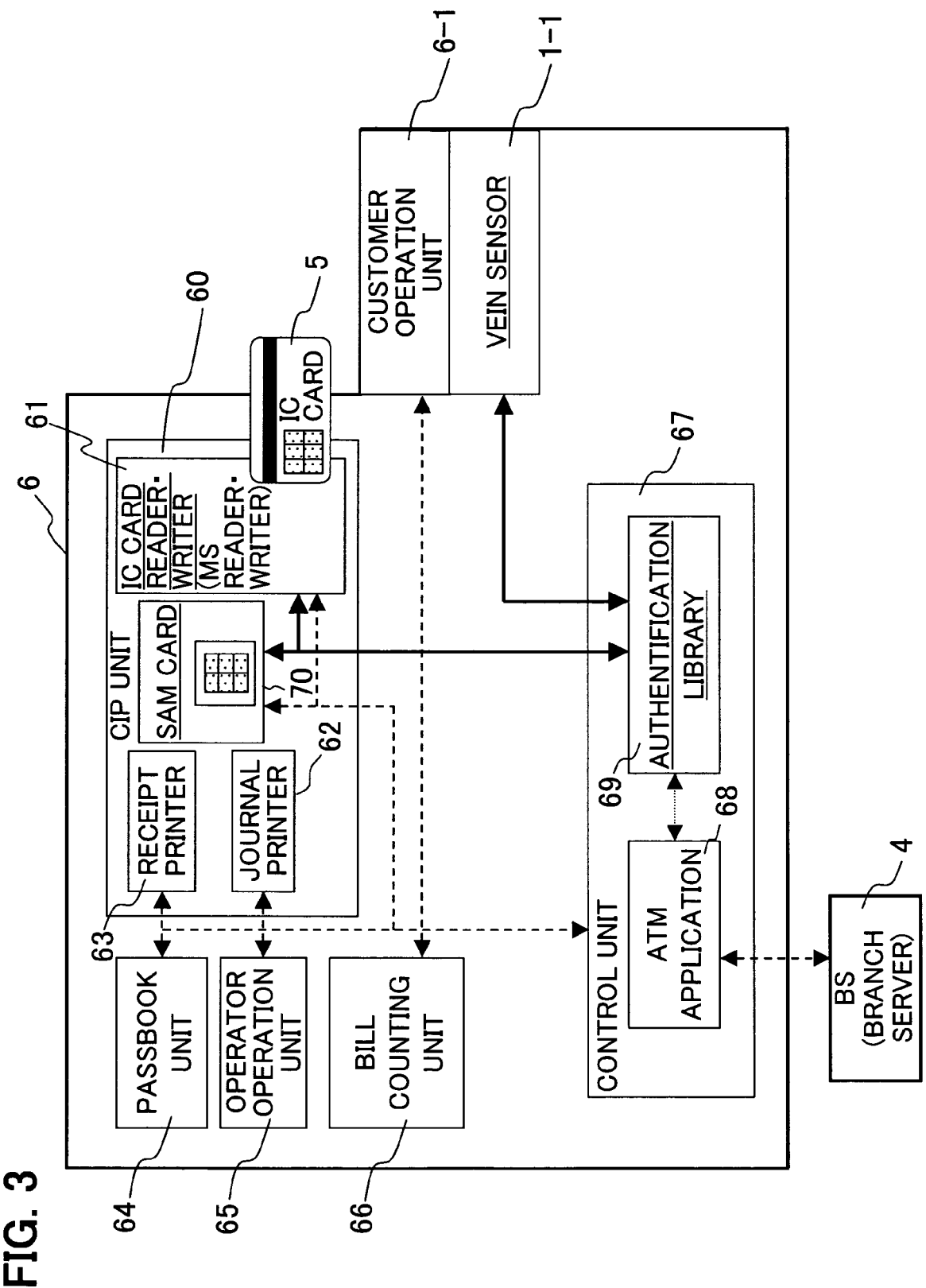
FIG. 3 is a block diagram of the ATM of FIG. 1.

FIG. 1 shows the configuration of a biometrics authentication system of one embodiment of the invention, FIG. 2 is a perspective view of the automated transaction machine of FIG. 1, and FIG. 3 is a block diagram of the automated transaction machine of FIG. 2.

FIG. 1 shows an example of a palm vein pattern authentication system in a financial institution, as an example of a biometrics authentication system. At the service area 2 of the financial institution, the palm image capture device 1 explained in FIG. 4, and a branch office terminal (for example, a personal computer) 3 connected thereto are provided. A user requesting vein pattern authentication places his hand over the palm image capture device (hereafter called the "image capture device") 1. The image capture device 1 reads an image of the palm, and through blood vessel image extraction processing performed by the terminal 3, the vein pattern is extracted and is registered in the terminal 3 as vein pattern data.

This vein pattern data is stored in the storage portion 4a of a database server 4 connected to the terminal 3, or in an individual card (for example, an IC card) 5 held by the user. The server 4 is connected to the service area terminal 8 of the service area 7 of the financial institution, and the service area terminal 8 is connected to the image capture device 1.

In order to make a withdrawal or perform some other financial transaction in the service area 7 of the financial institution, the user places his hand over the image capture device 1 provided in the service area 7. The image capture device 1 reads an image of the palm, and by means of blood vessel image extraction processing in the service area terminal 8, the vein pattern is extracted. Through verification processing, the service area terminal 8 verifies this vein pattern, as vein data, against the vein data registered in the database server 4, and authenticates the individual.

Further, the server 4 is connected to an ATM (automated transaction machine) 6 of the financial institution, so that using the ATM 6, transactions based on vein pattern authentication become possible. In order for a user to use the ATM 6 to make a withdrawal or perform some other financial transaction, the hand is placed over an image capture device 1-1 provided in the ATM 6. The image capture device 1-1 reads the palm image. Similarly to the service area terminal 8, the ATM 6 extracts the vein pattern (blood vessel image), and verifies this, as vein data, against the vein data registered in either an IC card 5 held by the user, or in the database server 4, and authenticates the individual.

FIG. 2 and FIG. 3 show the configuration of the ATM 6 of FIG. 1. As shown in FIG. 2, the ATM 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display.

Figure 4:
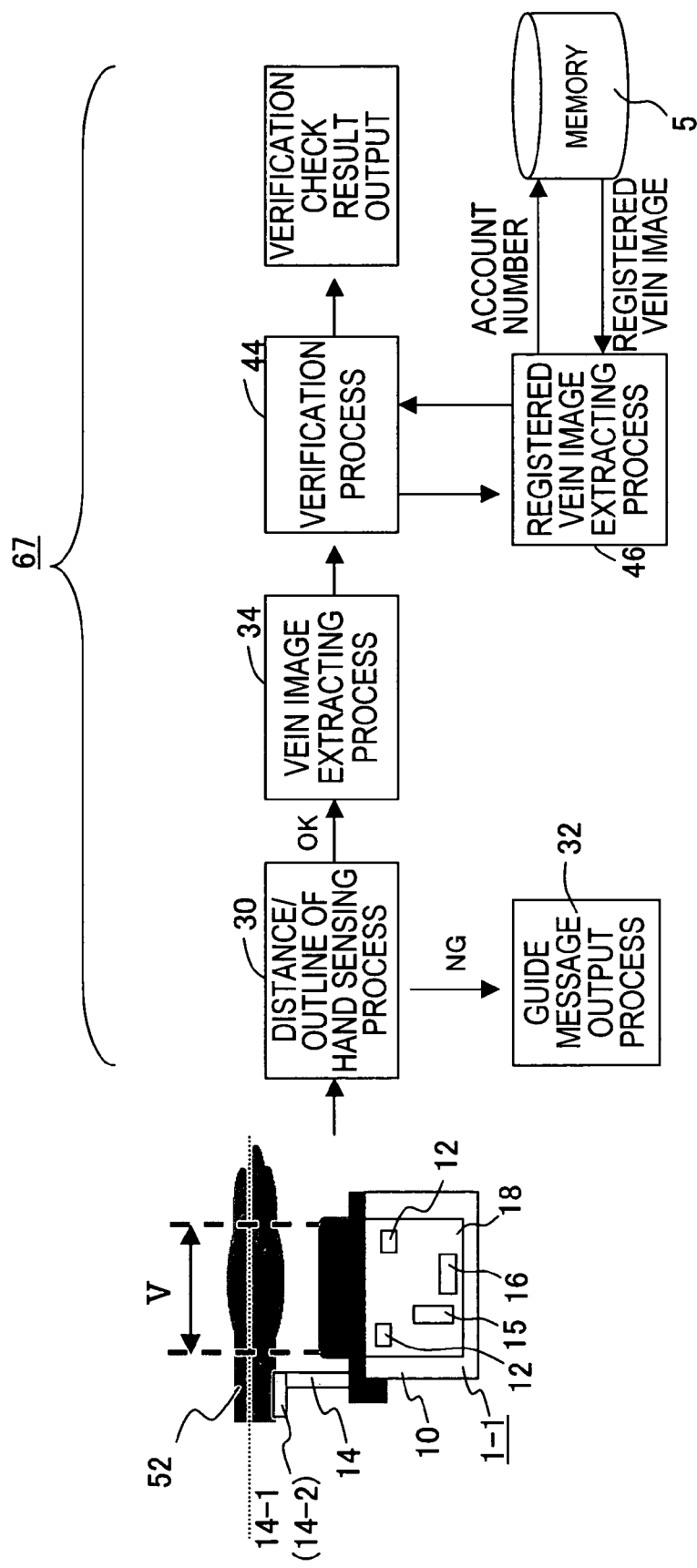
FIG. 4 is a functional block diagram of the biometrics information verification processing of FIG. 3.

In this example, the image capture device 1-1 is provided on the side of the customer operation panel 6-1. The sensor unit 18 explained in FIG. 4 is mounted on the forward side of the main unit 10 of the image capture device 1. On the forward portion (on the user side) of the sensor unit 18 is provided a front guide 14. The front guide 14 comprises a sheet of synthetic resin, transparent or substantially transparent. In order to serve the purposes of guiding the hand of the user in the front and of supporting the wrist, the cross-sectional shape of the front guide 14 has a vertical body and, in the top portion, a horizontal portion 14-1 to support the wrist. A series of depressions 14-2 are formed in the center of the horizontal portion 14-1, to facilitate positioning of the wrist.

Further, the sensor unit 18 of the main unit 10 faces rearward and is inclined upward, and a flat portion 22 is provided therebehind.

As shown in FIG. 3, the ATM 1 has a CIP (Card Reader Printer) unit 60 having a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation portion 65; a control unit 67; a customer operation panel 6-1 for operation and display; and an image capture device (vein sensor) 1-1.

The CIP unit 60 has an IC card reader/writer 61 which reads and writes the magnetic stripe and IC tip of an IC card 5; a receipt printer 63 which records transactions on a receipt; and a journal printer 62 which prints the history of transaction on journal forms.

The bankbook unit 64 records transactions on pages of a bankbook, and when necessary turns the pages. The attendant operation portion 65 is for operations by an attendant who perform operations upon occurrence of a fault or during inspections based on status display. The paper currency/coin counting unit 66 differentiates, counts, and stores inserted paper currency and coins, and counts and dispenses paper currency and coins in the required quantities.

The control unit 67 communicates with the server 4, and has an ATM application 68 which controls ATM operation and an authentication library 69 for authentication processing. A portion of this ATM application 68 acts in concert with the authentication library 67 so as to control biometrics authentication guidance screens of the UOP (customer operation panel) 6-1.

Biometrics Authentication Processing Method

Figure 5:
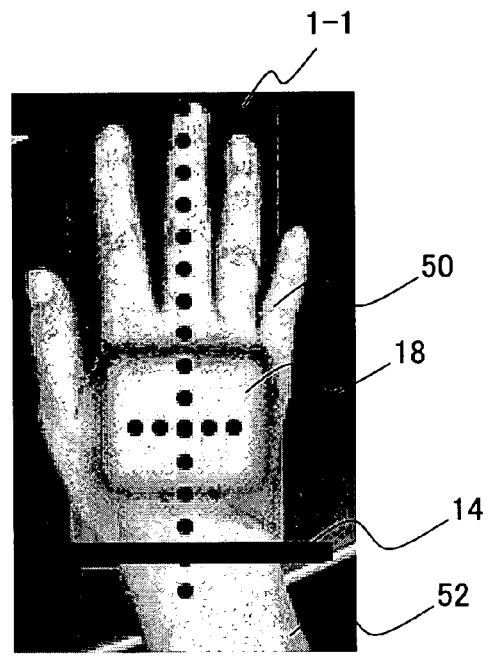
FIG. 5 is a top view showing the relation between the sensor of FIG. 4 and the palm of the hand.
Figure 6:
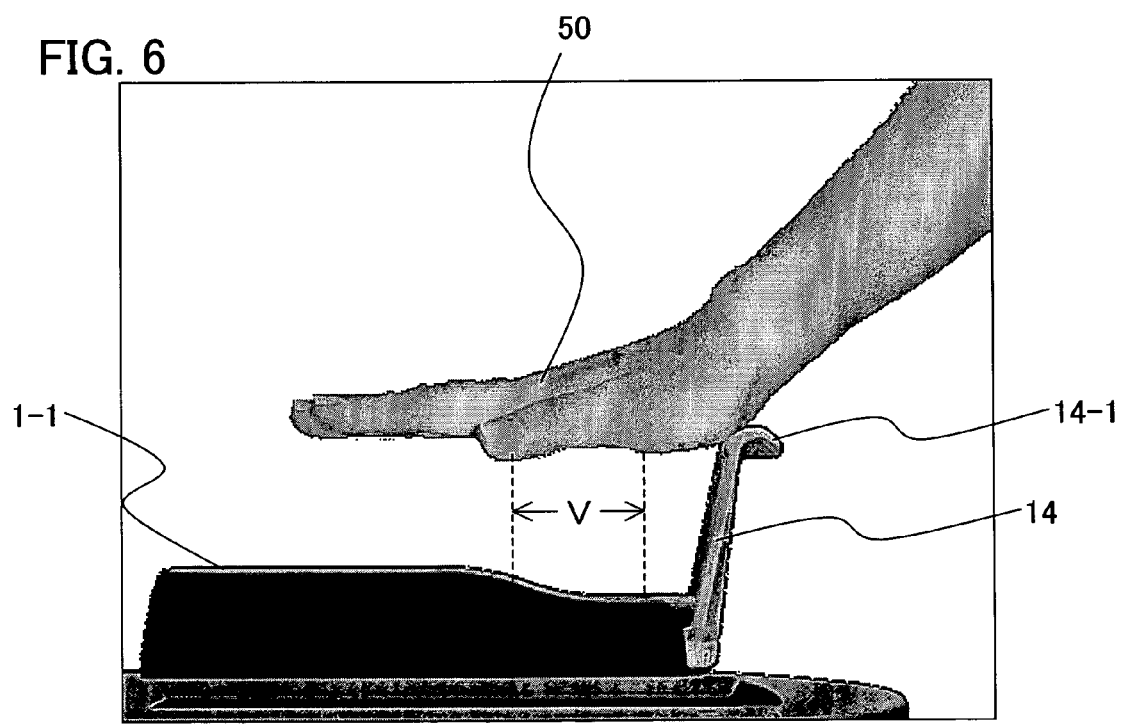
FIG. 6 is a lateral view showing the relation between the sensor of FIG. 4 and the palm of the hand.
Figures 7, 8:
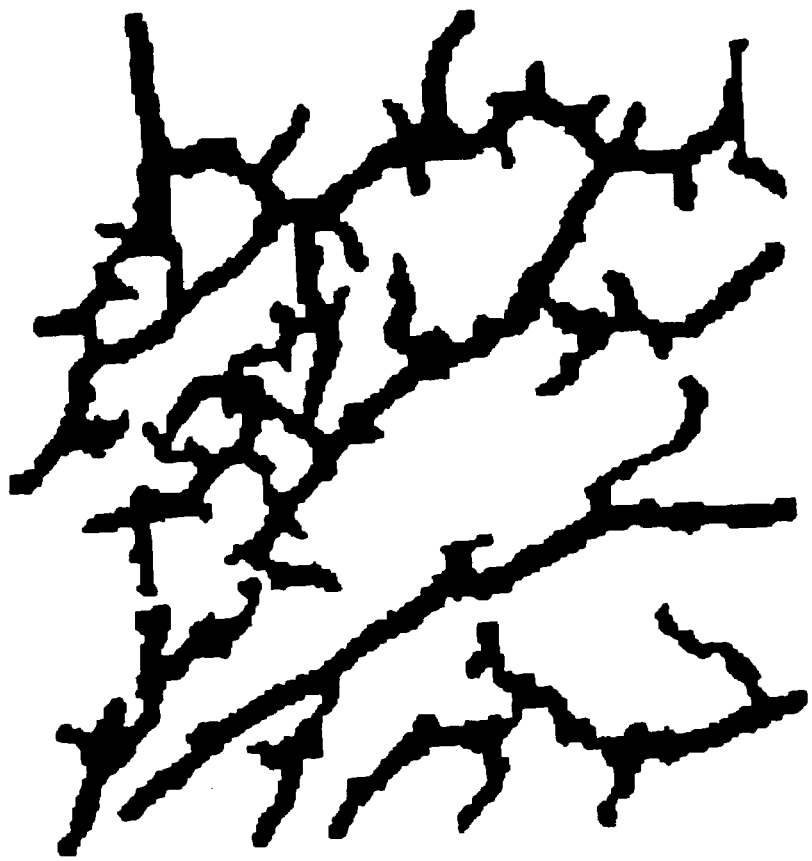
FIG. 7 explains the blood vessel image of FIG. 4.
FIG. 8 explains the blood vessel image data of FIG. 4.

FIG. 4 is a block diagram of biometrics authentication processing in one embodiment of the invention, FIG. 5 is a top view of the image capture device 1-1 of FIG. 4, FIG. 6 is a cross-sectional view of the image capture device of FIG. 4, FIG. 7 explains detected blood vessel images in FIG. 4, and FIG. 8 explains verification processing for FIG. 4.

As shown in FIG. 4, in the palm image capture device 1-1 of FIG. 1, the sensor unit 18 is mounted substantially in the center of the main unit 10. The front guide 14 is provided in the front portion (on the user side) of the sensor unit 18. The front guide 14 comprises a sheet of transparent or substantially transparent synthetic resin.

The front guide 14 serves the purposes of guiding the hand of the user in the front and of supporting the wrist. Hence above the sensor unit 18, the front guide 14 aids the user by guiding the wrist, and also supports the wrist. As a result, the attitude of the palm above the sensor unit 18, that is, the position, inclination, and size can be regulated. The cross-sectional shape of the front guide 14 has a vertical body and, in the top portion, a horizontal portion 14-1 to support the wrist. A series of depressions 14-2 are formed in the center of the horizontal portion 14-1, to facilitate positioning of the wrist.

On the other hand, the sensor unit 18 is provided with an infrared sensor (CMOS sensor) with focusing lens 16, and with a distance sensor 15 in the center, and on the periphery thereof with a plurality of near-infrared light-emitting elements (LEDs) 12. For example, near-infrared LEDs 12 are provided in eight places on the periphery, to emit near-infrared rays upwards.

The readable region V of this sensor unit 18 is regulated by the relation between the sensor, the focusing lens, and near-infrared light emission region. Hence the position and height of the front guide 14 is set such that the supported wrist is positioned in the readable region V.

As shown in FIG. 5, when the hand 50 is extended with palm flat, the palm has maximum area, and moreover is flat, so that when the palm is subjected to image capture in the image capture region V of the sensor unit 18, an accurate vein pattern which can be used in registration and verification is obtained. As shown in FIG. 6, when the distance from the sensor unit 18 to the palm is within a prescribed range, a sharp, focused image is obtained by the sensor 16 of the sensor unit 18.

Hence as shown in FIG. 4, by having the front guide 14 support the wrist 52 above the sensor unit 18, the position, inclination and height of the palm above the sensor unit are made precise with respect to the image capture range of the sensor unit 18, and the user's hand can be guided and supported.

Returning to FIG. 4, the authentication library 69 of the control portion 67 of the ATM 6 connected to the image capture device 1 executes a series of registration processing 30 to 46. The control portion 67 of the ATM 6 has, for example, a CPU, various types of memory, interface circuitry, and other circuits necessary for data processing. The CPU executes the series of registration processing 30 to 46.

Distance/hand outline detection processing 30 receives the distance from the image capture device 1-1 measured by the distance sensor 15, judges that the palm or other object is at a distance within a prescribed range from the sensor unit 18, and moreover the outline of the hand is detected from the image captured by the sensor unit 18, and based on the outline, a judgment is made as to whether the image can be used in registration and verification processing. For example, a judgment is made as to whether the palm appears sufficiently in the image.

As explained in FIG. 9 below, guidance message output processing 32 outputs to the UOP (User Operation Panel) 6-1 of the ATM 6 a message guiding the palm to the left or right, forward or backward, upward or downward, when the distance measured by the distance sensor 15 indicates that the hand is outside the image capture range, and when the image cannot be used in registration and verification processing. By this means, the hand of the user is guided into position over the image capture device 1.

Figure 25:
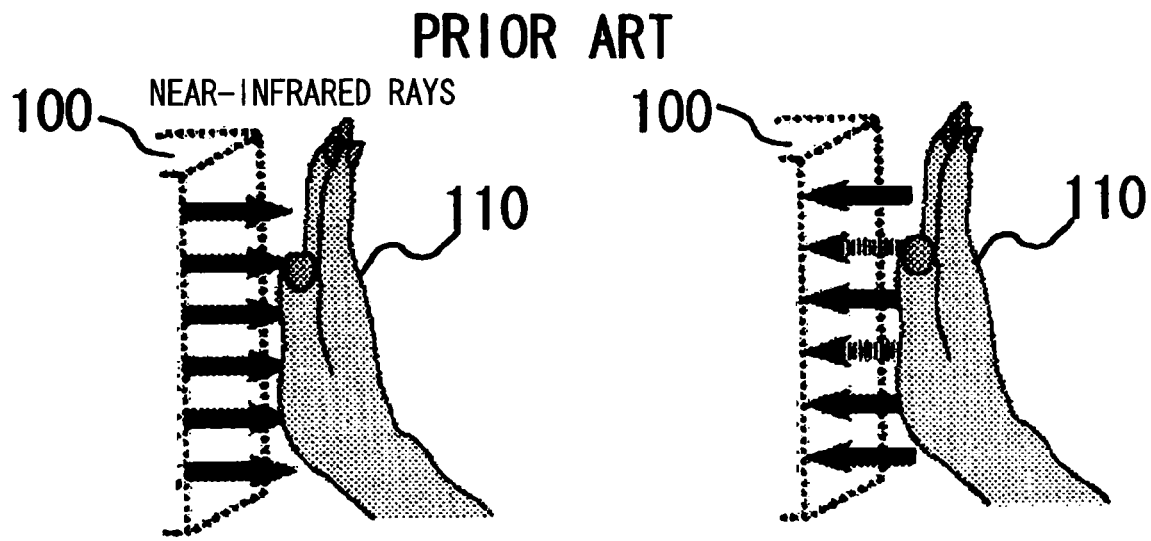
FIG. 25 explains a conventional palm image capture device.
Figure 26:
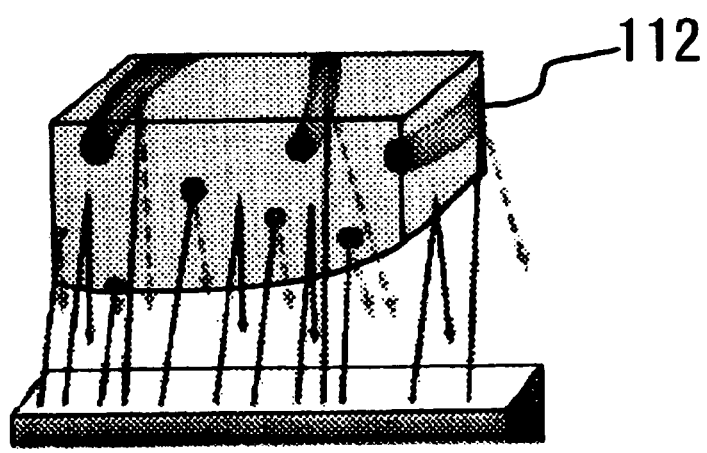
FIG. 26 explains the principles of a conventional palm image capture device.

Blood vessel image extraction processing 34 extracts a vein image from the image of the hand when hand outline detection processing 30 judges that an image has been captured with the hand held correctly. That is, as explained using FIG. 25 and FIG. 26, grayscale data of the image of the palm such as that of FIG. 8 is obtained through differences in reflectivity. The vein pattern image is an image like that shown in FIG. 7; the data is grayscale data such as that in FIG. 8.

Registered blood vessel image retrieval processing 46 retrieves registered blood vessel image data R1, R2, R3 corresponding to the individual ID (for example account number) from the storage portion of the IC card 5 shown in FIG. 3. Verification processing 44 compares the blood vessel image data N1 detected in blood vessel image detection processing 34 with registered blood vessel image data N2 as shown in FIG. 8, performs verification processing, and outputs the verification result.

In such a non-contact authentication system, the above-described guidance messages are convenient for the user, and are useful in operation by users not familiar with the authentication system and in enabling rapid authentication.

Guidance Screen Control Method

Figure 10:
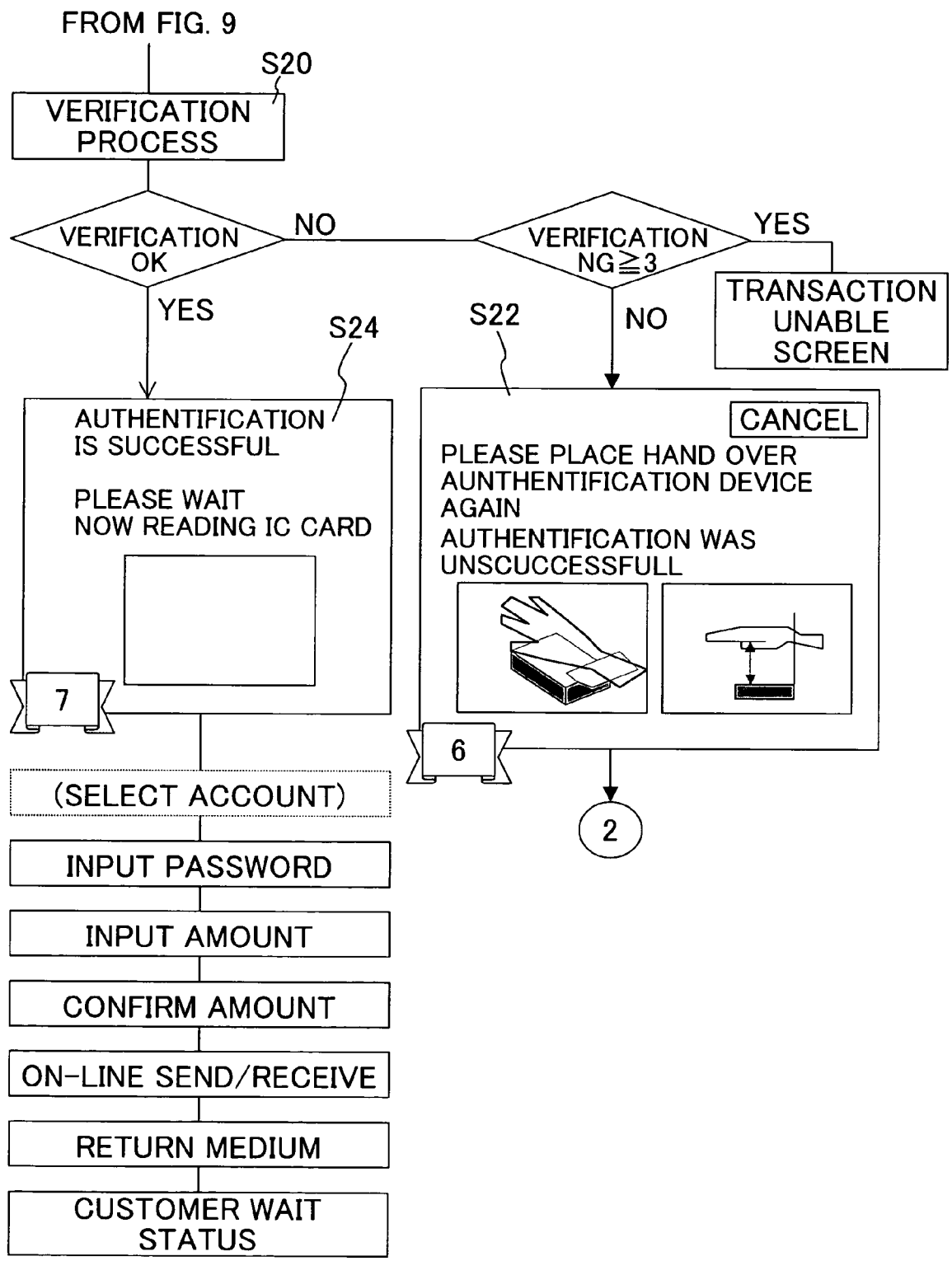
FIG. 10 is a second flow diagram of transaction processing, comprising screen guidance processing of this invention.
Figure 11:
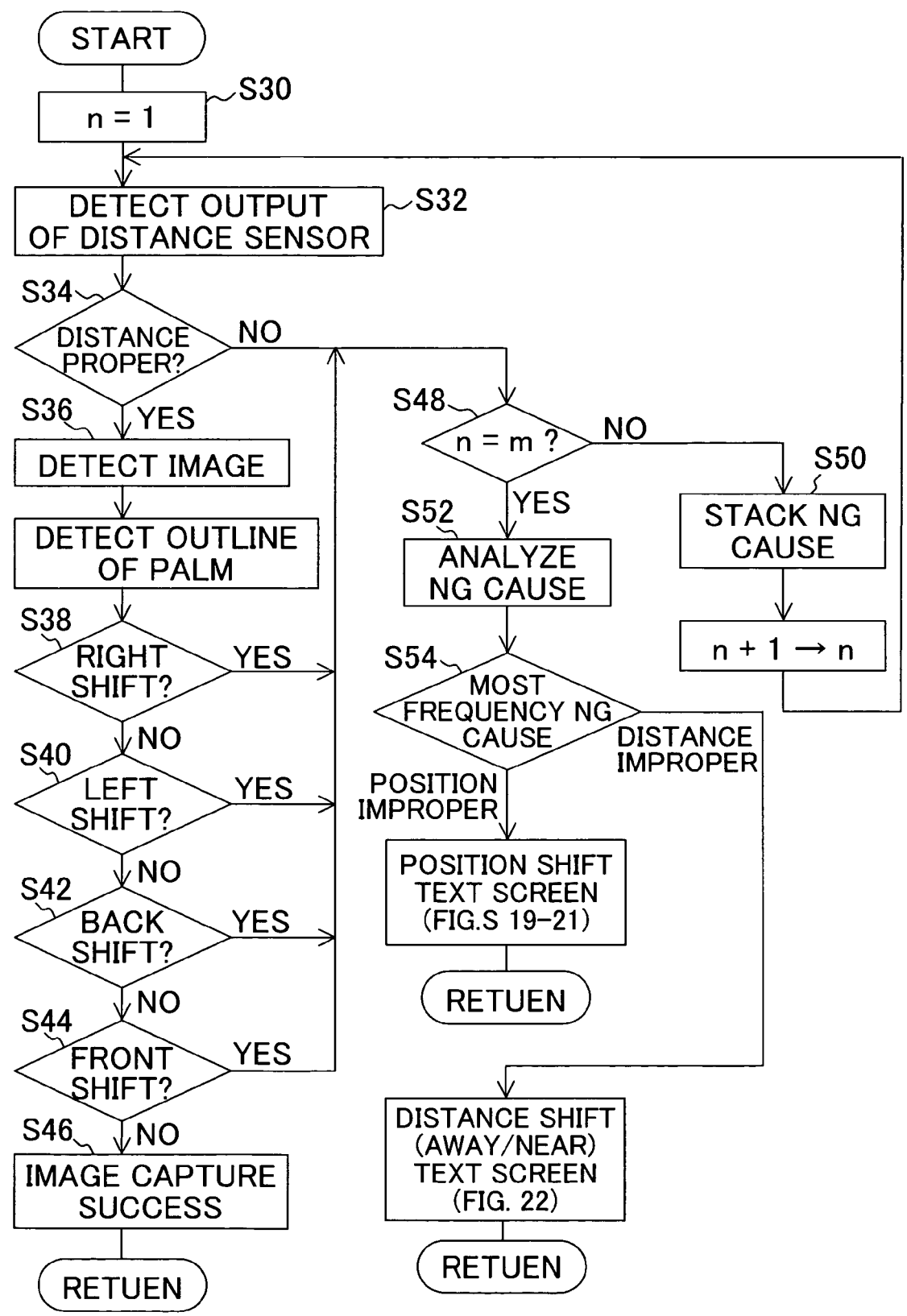
FIG. 11 is a flow diagram of the image capture processing of FIG. 9.
Figure 12:
FIG. 12 explains a first operation instruction screen image at the time of transaction initiation in FIG. 9.
Figure 13:
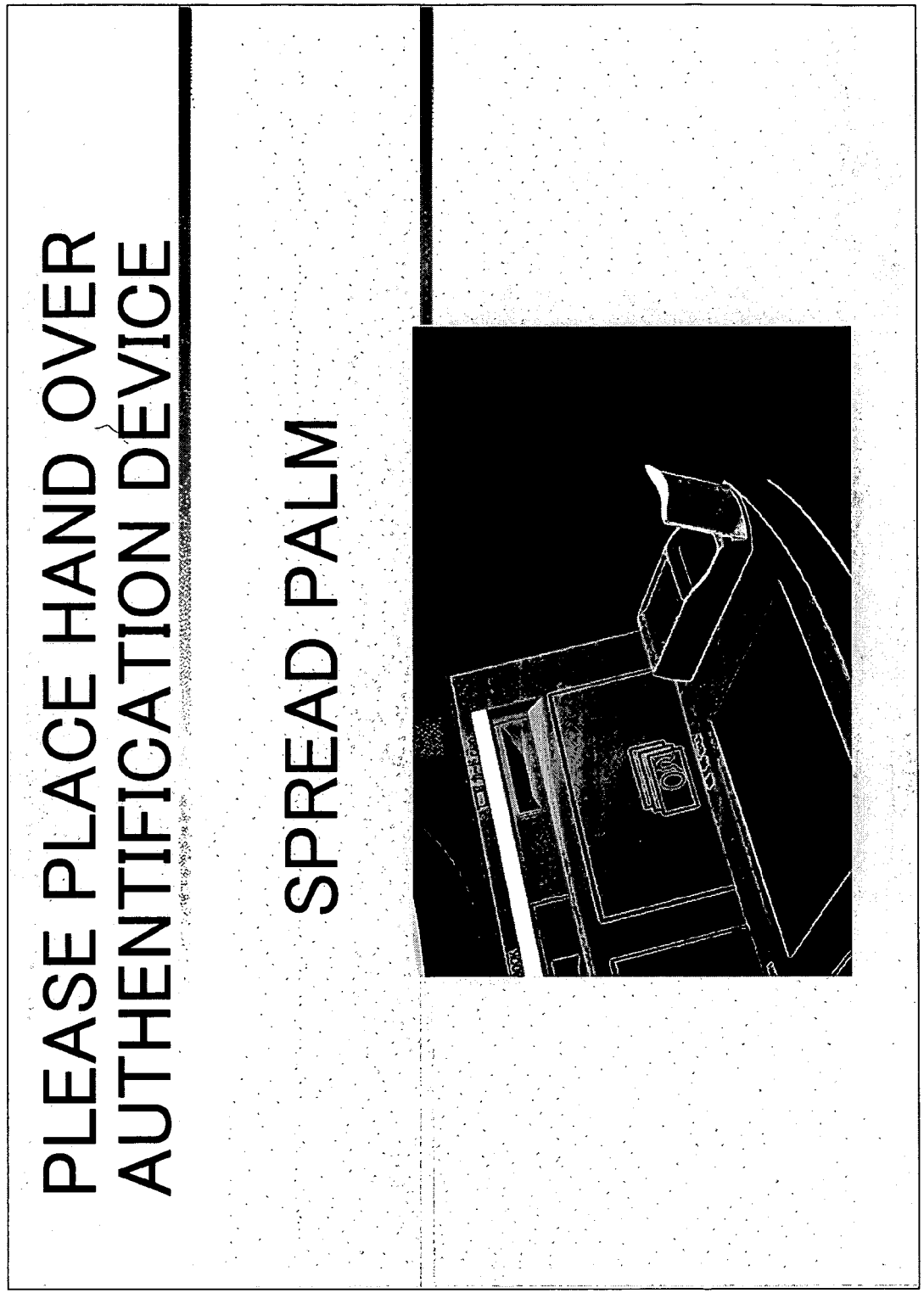
FIG. 13 explains a second operation instruction screen image at the time of transaction initiation in FIG. 9.
Figure 14:
FIG. 14 explains a third operation instruction screen image at the time of transaction initiation in FIG. 9.
Figure 15:
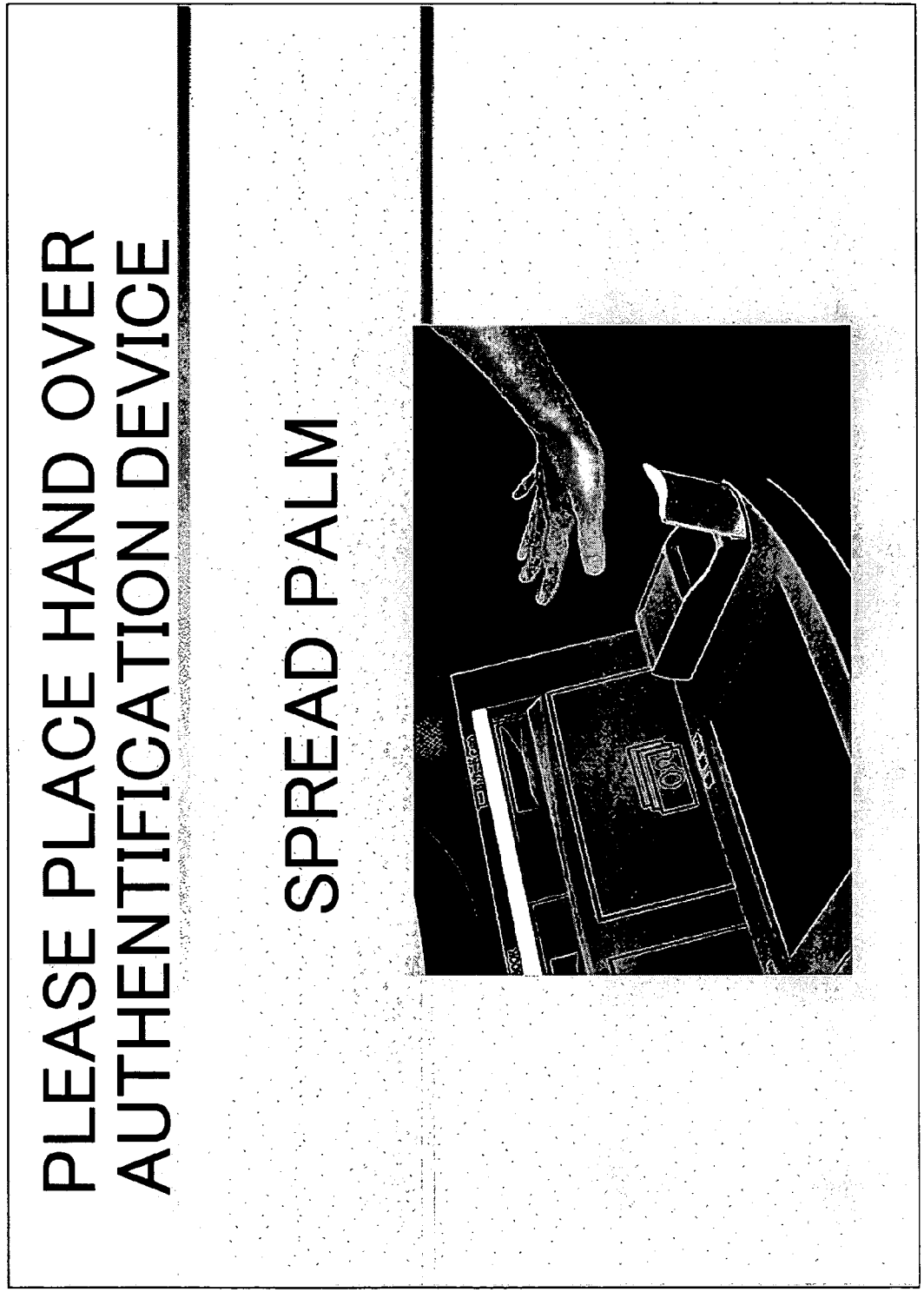
FIG. 15 explains a fourth operation instruction screen image at the time of transaction initiation in FIG. 9.
Figure 16:
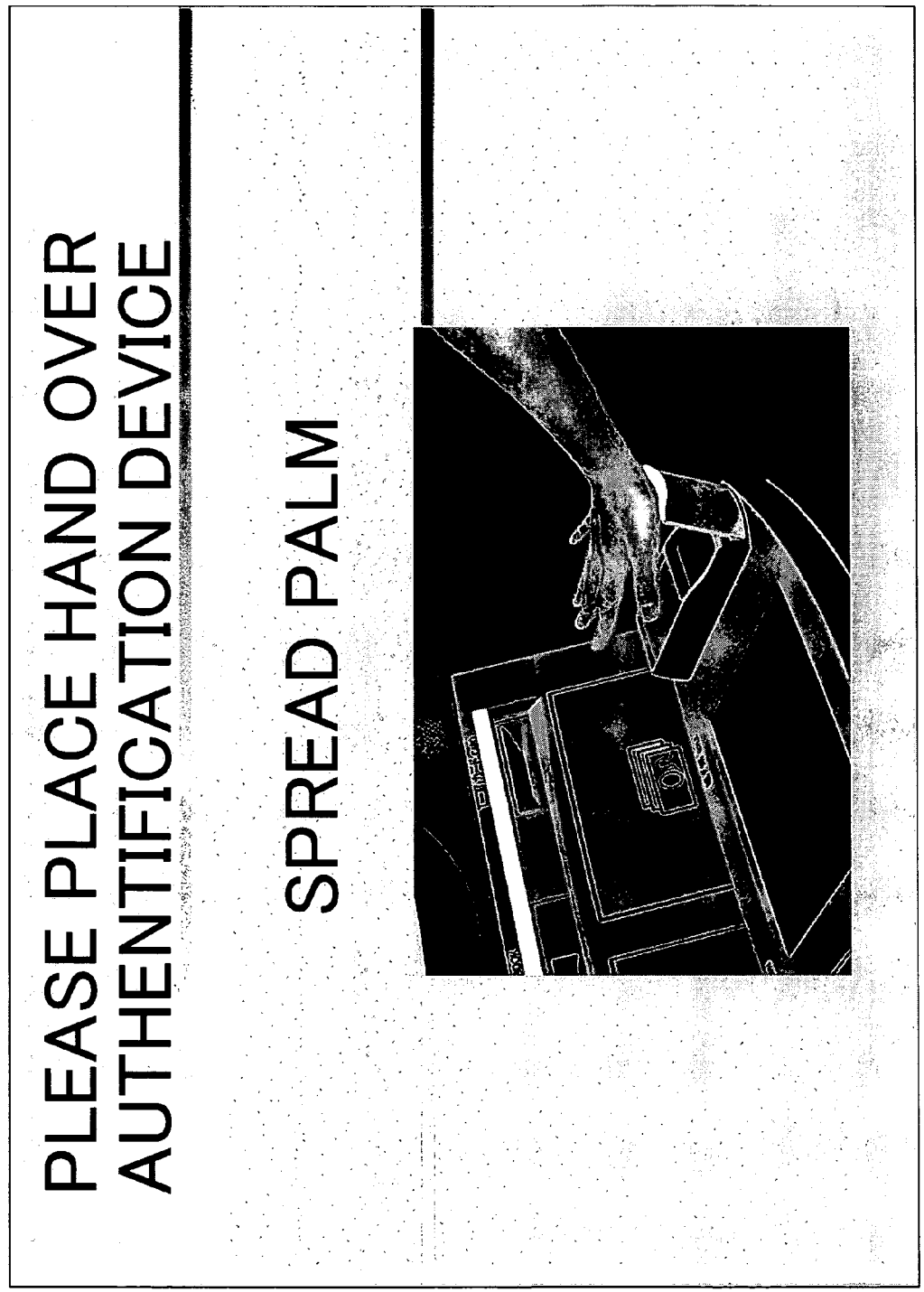
FIG. 16 explains a fifth operation instruction screen image at the time of transaction initiation in FIG. 9.
Figure 17:
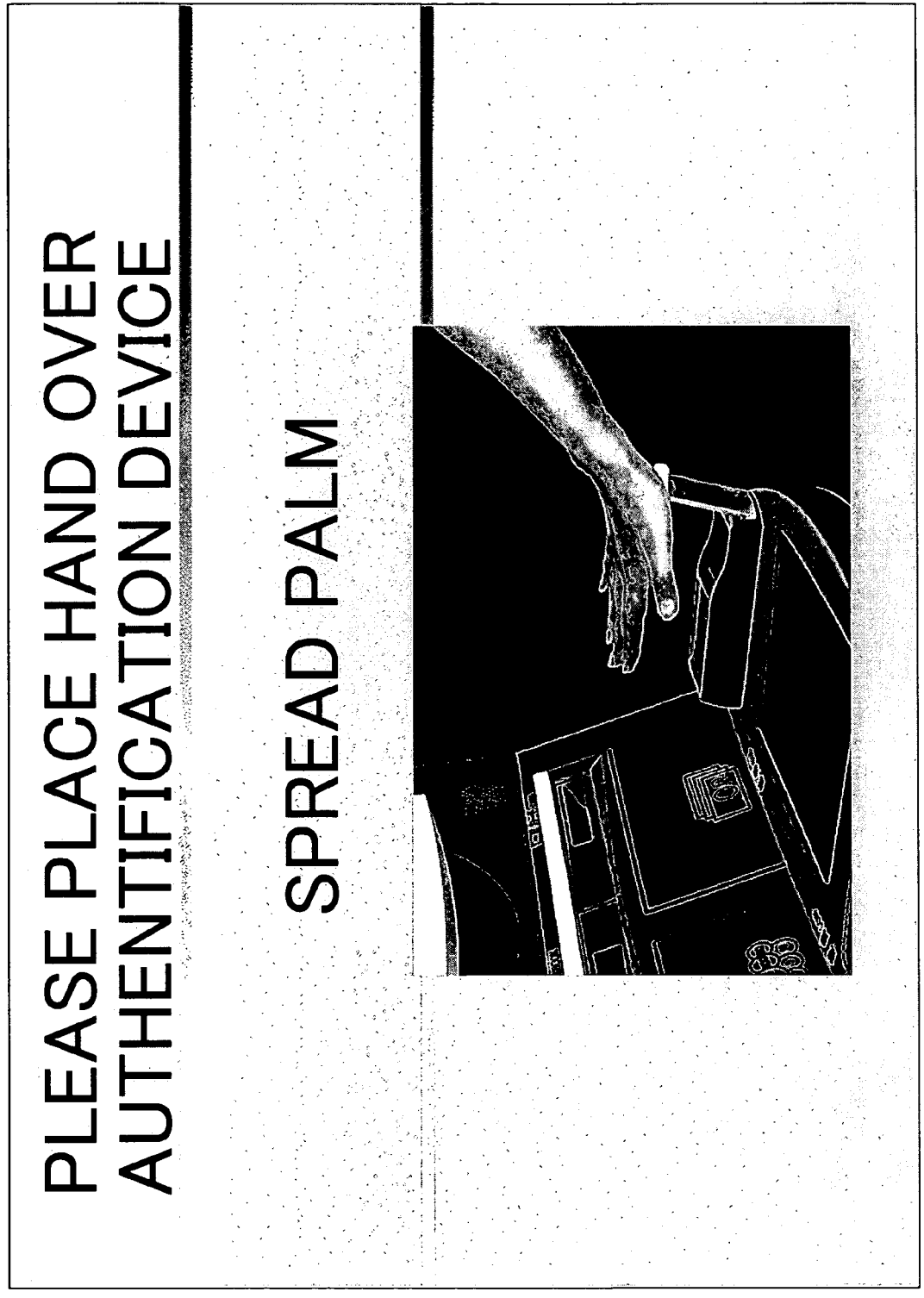
FIG. 17 explains a sixth operation instruction screen image at the time of transaction initiation in FIG. 9.
Figure 18:
FIG. 18 explains a seventh operation instruction screen image at the time of transaction initiation in FIG. 9.

Next, the distance/hand outline detection processing 30 and guidance message output processing 32 of FIG. 4 are explained in more detail using FIG. 9 through FIG. 22. FIG. 9 and FIG. 10 show the flow of transaction processing including guidance message processing; FIG. 11 shows the flow of image capture processing in FIG. 9; FIG. 12 through FIG. 18 explain palm authentication operation guidance screen images at the time of initiation of a transaction; FIG. 19 through FIG. 22 explain guidance screen images when image capture is not successful; and FIG. 23 explains a notification screen image when image capture is successful.

Below, FIG. 11 through FIG. 23 are referenced in explaining transaction processing including guidance message processing of FIG. 9 and FIG. 10.

(S10) While in the customer wait state, the control unit 67 of the ATM 6 detects the pressing of a transaction key from the UOP 6-1.

(S12) When a transaction key is depressed and an IC card 5 is inserted, screens giving guidance in palm authentication operation at the initiation of a transaction, FIG. 12 through FIG. 18, are displayed dynamically on the UOP 6-1. As shown in FIG. 12 through FIG. 18, screens consist of the common text "Please place your hand over the authentication device" and "Spread your hand out wide" and images of the order of operation. Shown in series are the front image of the ATM 6 which is the first screen in FIG. 12, a perspective-view image of the ATM 6 centered on the authentication device which is the second screen in FIG. 13, images of a hand being brought successively closer to the authentication device in the screen of FIG. 13 which are the third, fourth, and fifth screens in FIG. 14, FIG. 15 and FIG. 16, a perspective-view image of a hand placed over the authentication device which is the sixth image in FIG. 17, and a side-view image of the hand placed over the authentication device which is the seventh screen in FIG. 18. These images of the order of operation are displayed repeatedly within a prescribed operation time (for example, 10 seconds).

(S14) The control unit 67 of the ATM 6 executes the image capture processing described below in FIG. 11, performs a prescribed number of image captures until image capture is successful, and within the prescribed number, judges whether image captures are successful.

Figure 19:
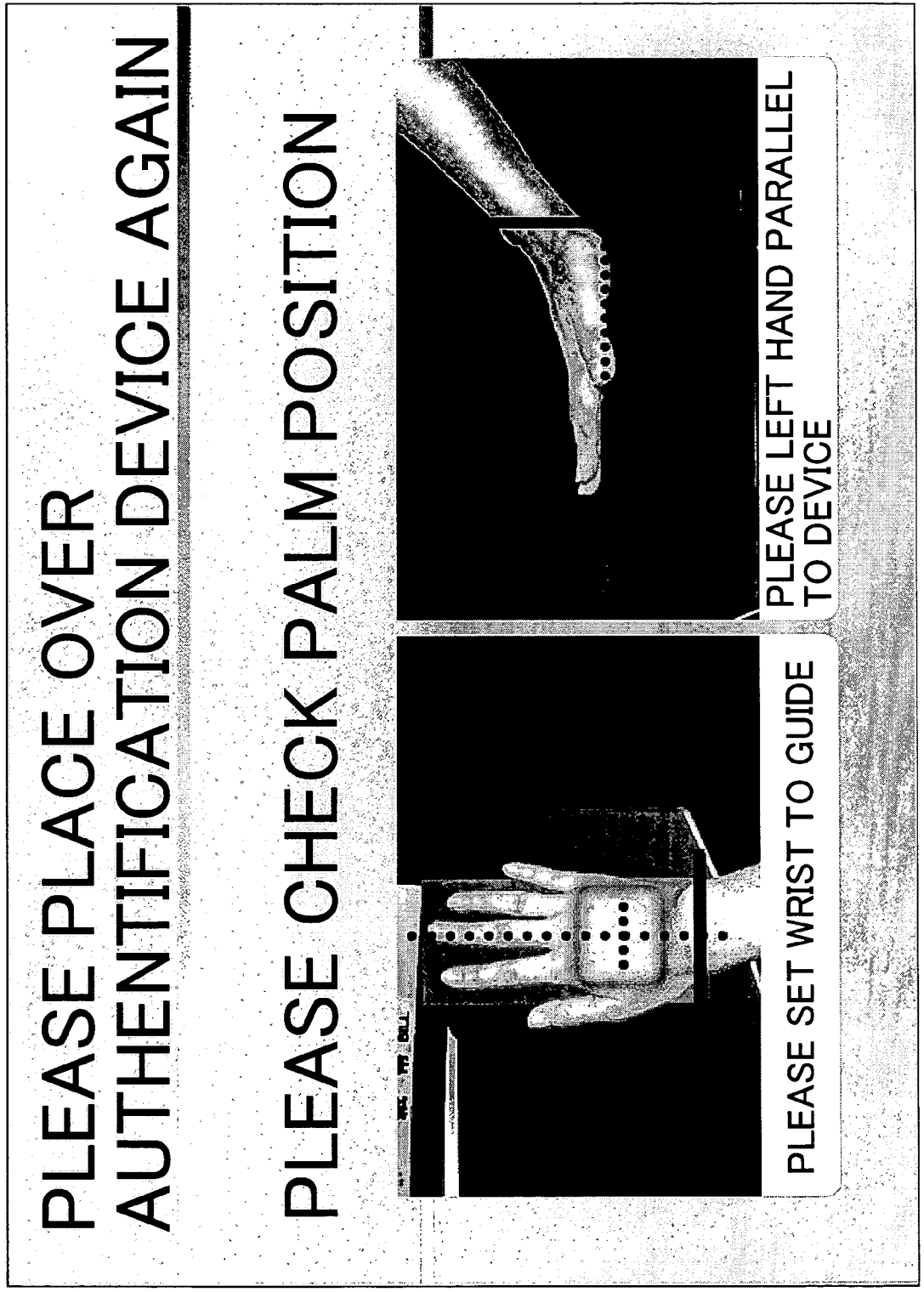
FIG. 19 explains a first operation guidance screen image at the time of unsuccessful image capture in FIG. 9.
Figure 20:
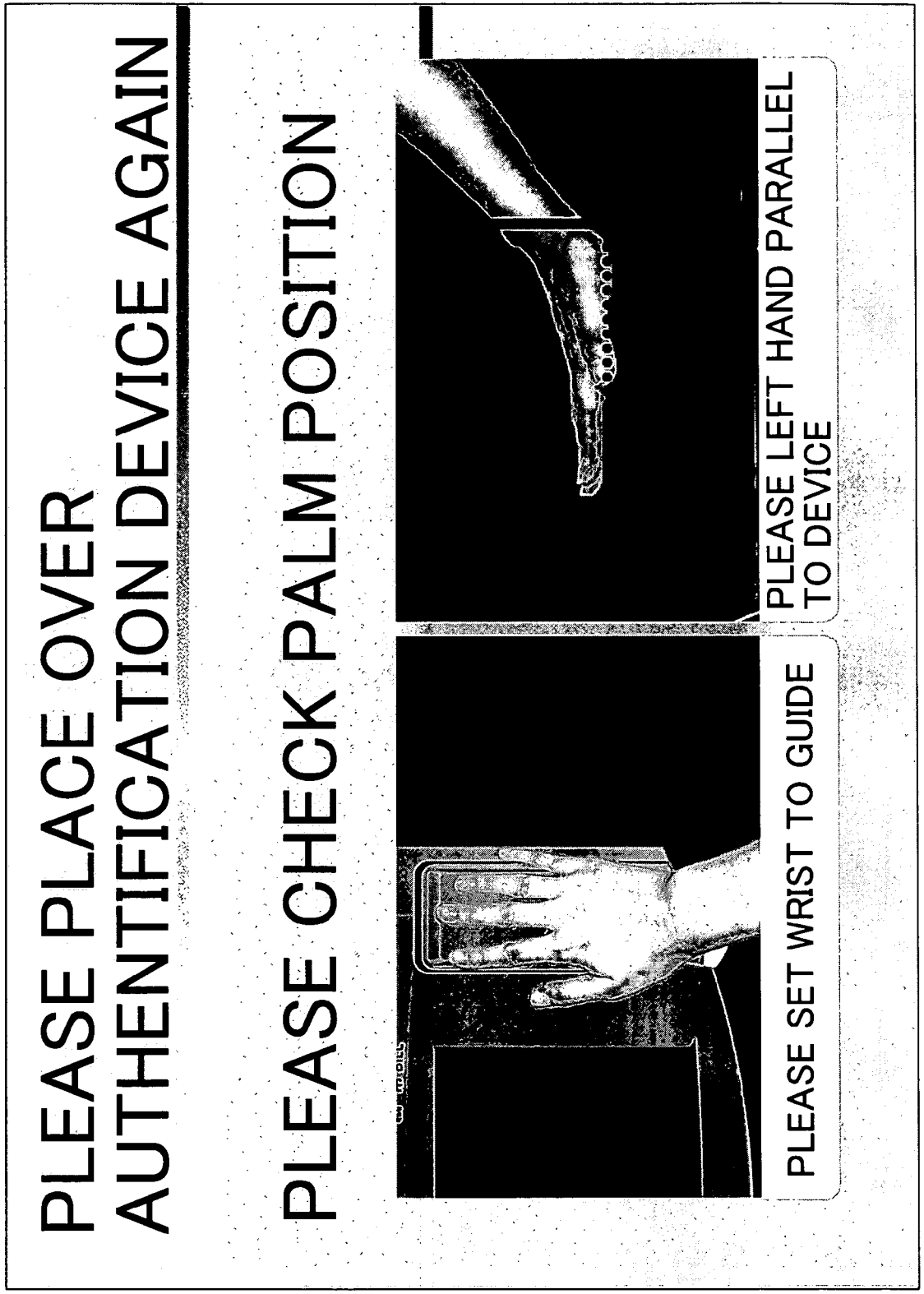
FIG. 20 explains a second operation guidance screen image at the time of unsuccessful image capture in FIG. 9.
Figure 21:
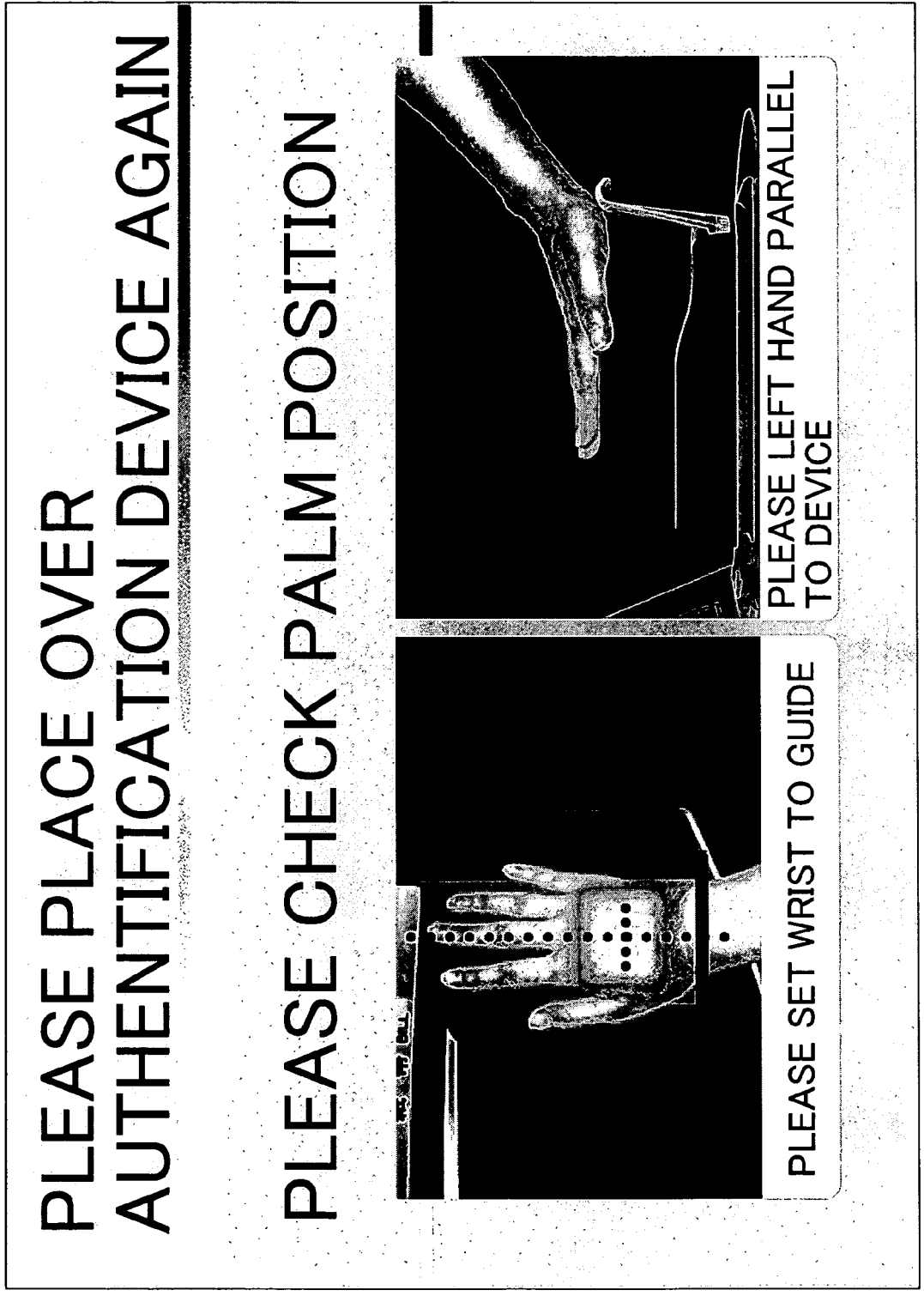
FIG. 21 explains a third operation guidance screen image at the time of unsuccessful image capture in FIG. 9.
Figure 22:
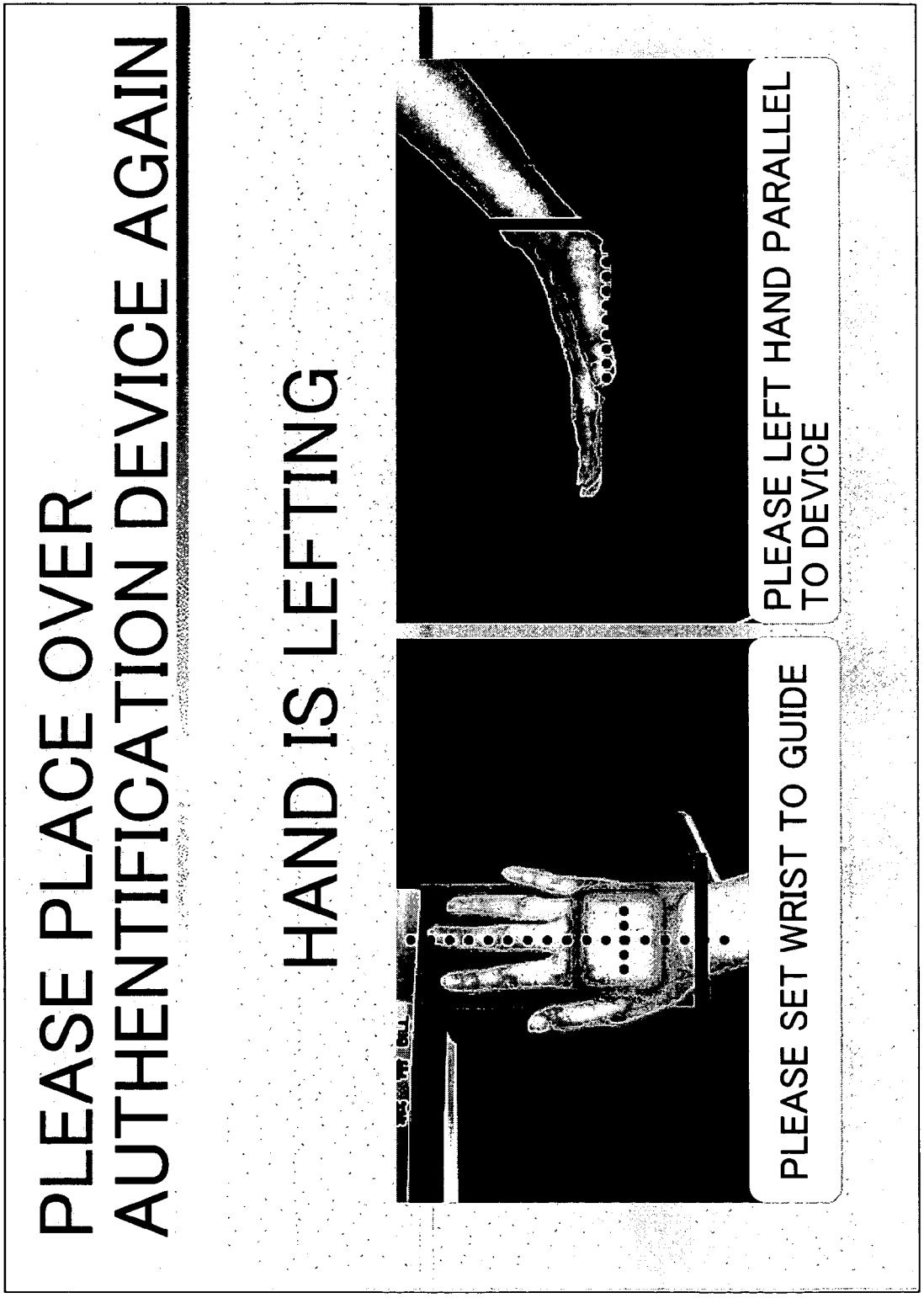
FIG. 22 explains a fourth operation guidance screen image at the time of unsuccessful image capture in FIG. 9.

(S16) If image capture is not successful within the prescribed number of operations, the guidance screens of FIG. 19 through FIG. 22 are displayed on the UOP 6-1. These guidance screens display guidance text corresponding to the cause according to analysis of the reason for lack of success in capturing images. FIG. 19 through FIG. 21 are examples of guidance screens for cases in which hand outline detection indicates that the palm is shifted to the left, right, forward, or backward with respect to the sensor 18. In FIG. 19 through FIG. 21, screens consist of the text "Please place your hand over the authentication device again" and "Please check the position of your hand", and top- and side-view images of the appropriate position of the hand. Here, top- and side-view images with dashed lines added to indicate the appropriate position of the hand, which are the first screen of FIG. 19, a top-view image and a side-view image with a dashed line added to indicate the appropriate position of the hand, which are the second screen of FIG. 20, and a top-view image with dashed lines added to indicate the appropriate position of the hand and a side-view image without such lines added, which are the third screen of FIG. 21, are displayed in order. These order-of-operation screens are displayed repeatedly over a prescribed operation time (for example, 10 seconds). Similarly, FIG. 22 is an example of a guidance screen for a case in which distance detection indicates that the palm is too far away from the sensor 18. In FIG. 22, the screen consists of the text "Please place your hand over the authentication device again" and "Your hand is too far away", together with top- and side-view images of the appropriate hand position. Processing then returns to step S14.

Figure 23:
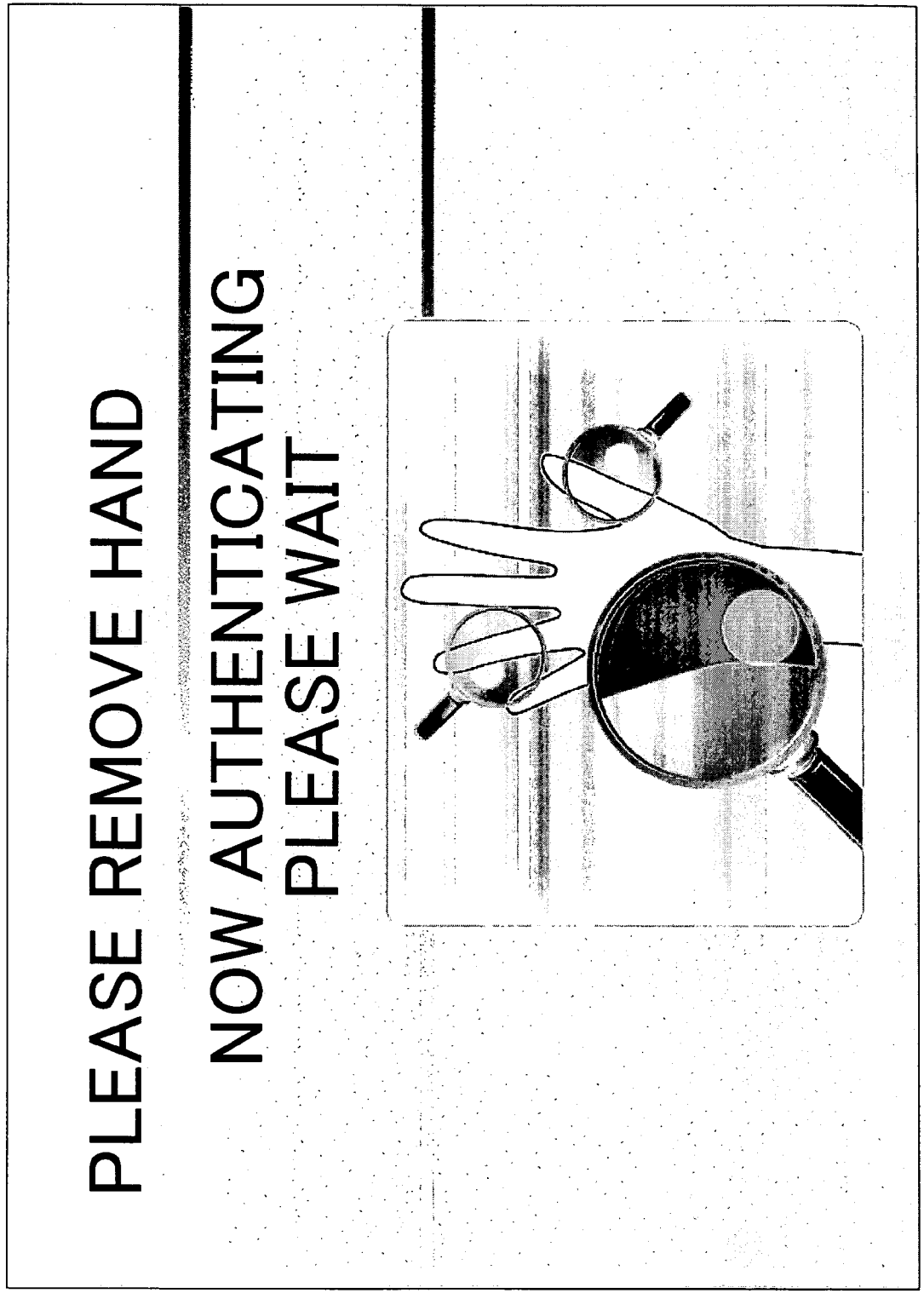
FIG. 23 explains a state screen image at the time of unsuccessful image capture in FIG. 9.

(S18) If image capture succeeds within the prescribed number of operations, the authentication initiation screen of FIG. 23 is displayed on the UOP 6-1. The screen of FIG. 23 consists of the text "Please remove your hand", "Please wait", and "Now authenticating", and a prescribed image.

(S20) The control unit 67 of the ATM 6 performs the verification processing explained in FIG. 4, and judges whether the verification result is OK. If not OK, that is the verification result is NG, the control unit 67 judges whether there have been three consecutive NG results. If there have been three consecutive NG results, it is assumed that service is not possible, a service-not-possible screen is displayed, and processing ends.

Figure 9:
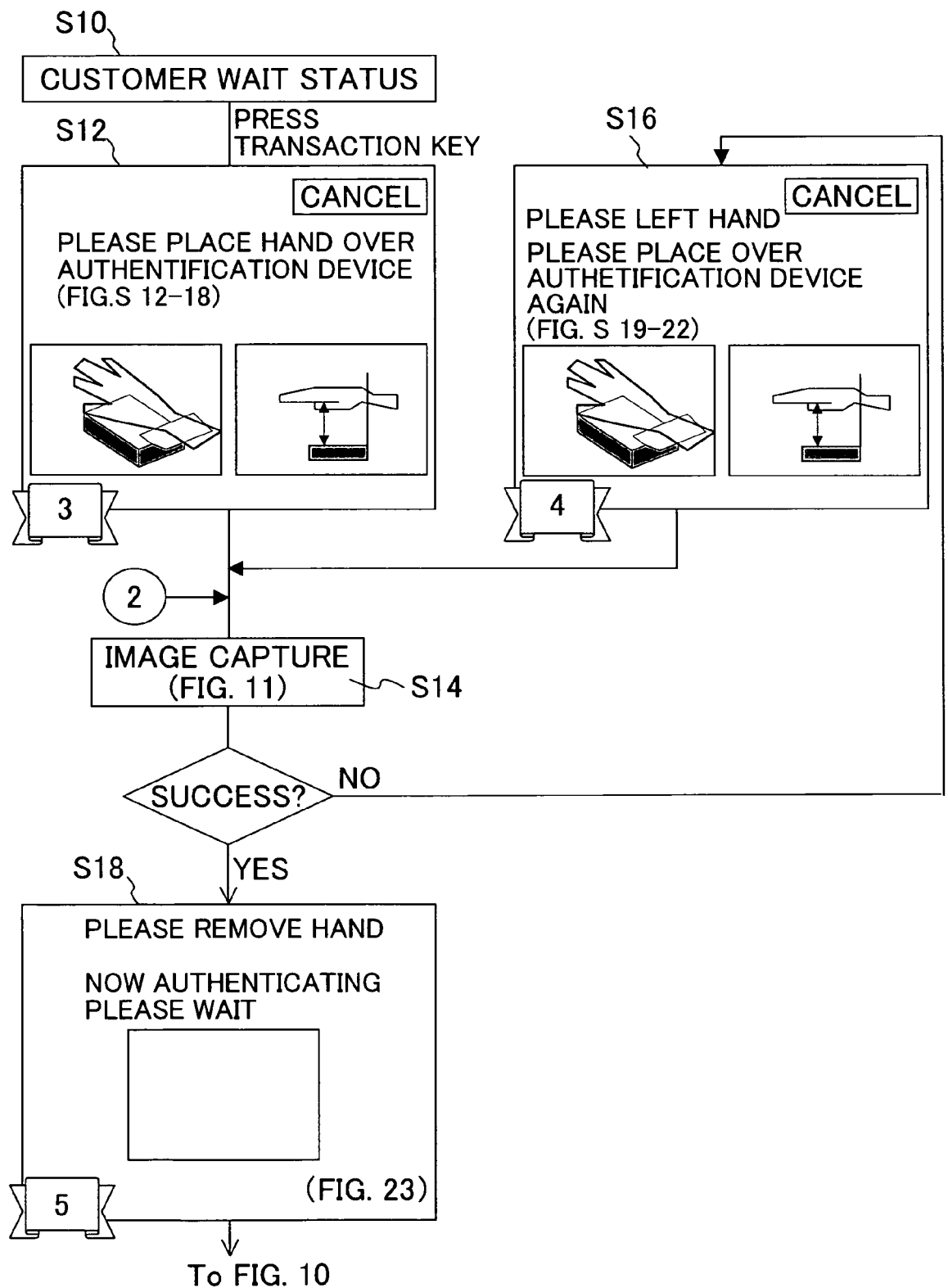
FIG. 9 is a first flow diagram of transaction processing, comprising screen guidance processing of this invention.

(S22) If on the other hand there have not been three consecutive verification results of NG, in order to repeat image capture, a repeat-image-capture screen containing the text "Please place your hand over the authentication device again" and "Authentication was unsuccessful" and a prescribed image is displayed on the UOP 6-1, and processing returns to the image capture processing of step S14 in FIG. 9.

(S24) If in step S20 the verification result is OK, an authentication-OK screen is displayed on the UOP 6-1, and processing proceeds to normal ATM transaction processing. That is, an account is selected if necessary, a password is input, an amount is input, the amount is confirmed, data is exchanged online with the server, media (card, bankbook and cash) is returned or dispensed, and the system then waits for the next customer.

Next, the verification processing of step S14 in FIG. 9 is explained using FIG. 11.

(S30) The image capture operations counter value n is initialized to "1".

(S32) The distance sensor 15 is caused to measure the distance to the palm, and the output is detected.

(S34) The detected distance and the focal distance determined by the sensor and lens 16 of the sensor unit 18 are compared, and a judgment is made as to whether the distance to the palm is within the appropriate range.

Figure 27:
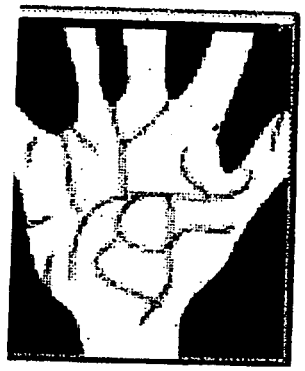
FIG. 27 explains one conventional palm authentication technology.
Figure 27:
Figure 28:
FIG. 28 explains another conventional palm authentication technology.
Figure 28:
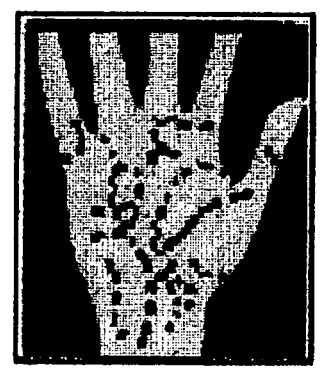

(S36) If the distance is appropriate, near-infrared light is irradiated from the image capture device 1-1, the reflected light is received by the sensor 16, and an image of the palm is obtained. The above-described hand outline detection processing 30 detects the hand outline from the image captured by the image capture device 1, and judges from the outline whether the image is an image which can be used in verification processing. That is, as shown in FIG. 27 and FIG. 28, the image is used to judge whether the palm appears sufficiently in the image. For example, the distance between the outline and the image frame is calculated, and the distance is used to judge whether to shift position to the left or right, or forward or backward. Also, the center position of the palm may be calculated from the overall outline, and this may be used to judge whether to shift position leftward, rightward, forward or backward.

(S38) First, a judgment is made as to whether the position is shifted rightward, and if so, processing proceeds to step S48.

(S40) Next, if not shifted rightward, a judgment is made as to whether the position is shifted leftward, and if so, processing proceeds to step S48.

(S42) Next, if not shifted leftward, a judgment is made as to whether the position is shifted rearward (backward), and if so, processing proceeds to step S48.

(S44) Next, if not shifted backward, a judgment is made as to whether the position is shifted forward, and if so, processing proceeds to step S48.

(S46) If not shifted forward either, no shift in position has occurred, and so the image capture is judged to be successful, and the image is provided for verification processing. Execution then returns.

(S48) On the other hand, if in step S34 the distance is not appropriate, or in steps S38 to S44 a shift in position is detected, then a judgment is made as to whether the image capture operations counter value n has reached a specified number m (for example, 10 times).

(S50) If the image capture operations counter value n has not reached the specified number m (for example, 10), then the image capture NG cause (left/right/forward/backward position shift, distance shift) is stacked and held. The image capture operations counter value n is then updated to n+1, and processing returns to step S32.

(S52) On the other hand, if the image capture operations counter value n has reached the specified number m (for example, 10 times), it is judged that the relation between the palm and the sensor must be corrected. Hence the specified number m (for example, 10) of stacked image capture NG causes are analyzed. For example, these may be classified as position shifts (left, right, forward, backward) and distance shifts, and the number of each counted.

(S54) The most frequency cause of image capture NG is then detected from the count totals. If position shifts are the most common, then the guidance screens image with position-shift text shown in FIG. 19 through FIG. 21 are selected, and processing returns. If distance shifts are the most common, then the guidance screen image with the distance-shift text shown in FIG. 22 is selected, and processing returns.

Thus a plurality of image capture operations (including distance measurement) are performed in short intervals, and when there are frequent image capture NG occurrences, these are stacked, and if image capture NGs are not resolved after a prescribed number of image capture operations, it is judged that the relation between the palm and the sensor must be corrected. Stacked image capture NG causes in a specified number m (for example, 10) are analyzed, and screen guidance with regard to placement of the hand is provided according to the analysis results.

Hence because guidance screens do not change frequently, the user can fully understand the cause given and can change the placement of his hand. As a result, confusion on the part of the user can be avoided, the hand can quickly be placed in the appropriate position and at the appropriate distance, and the speed of authentication can be improved.

Because the most frequently occurring image capture NG cause is selected and a screen for that cause is presented, causes resulting in only occasional image capture NGs can be excluded, and the user can be guided more reliably.

Other Embodiments

Figure 24:
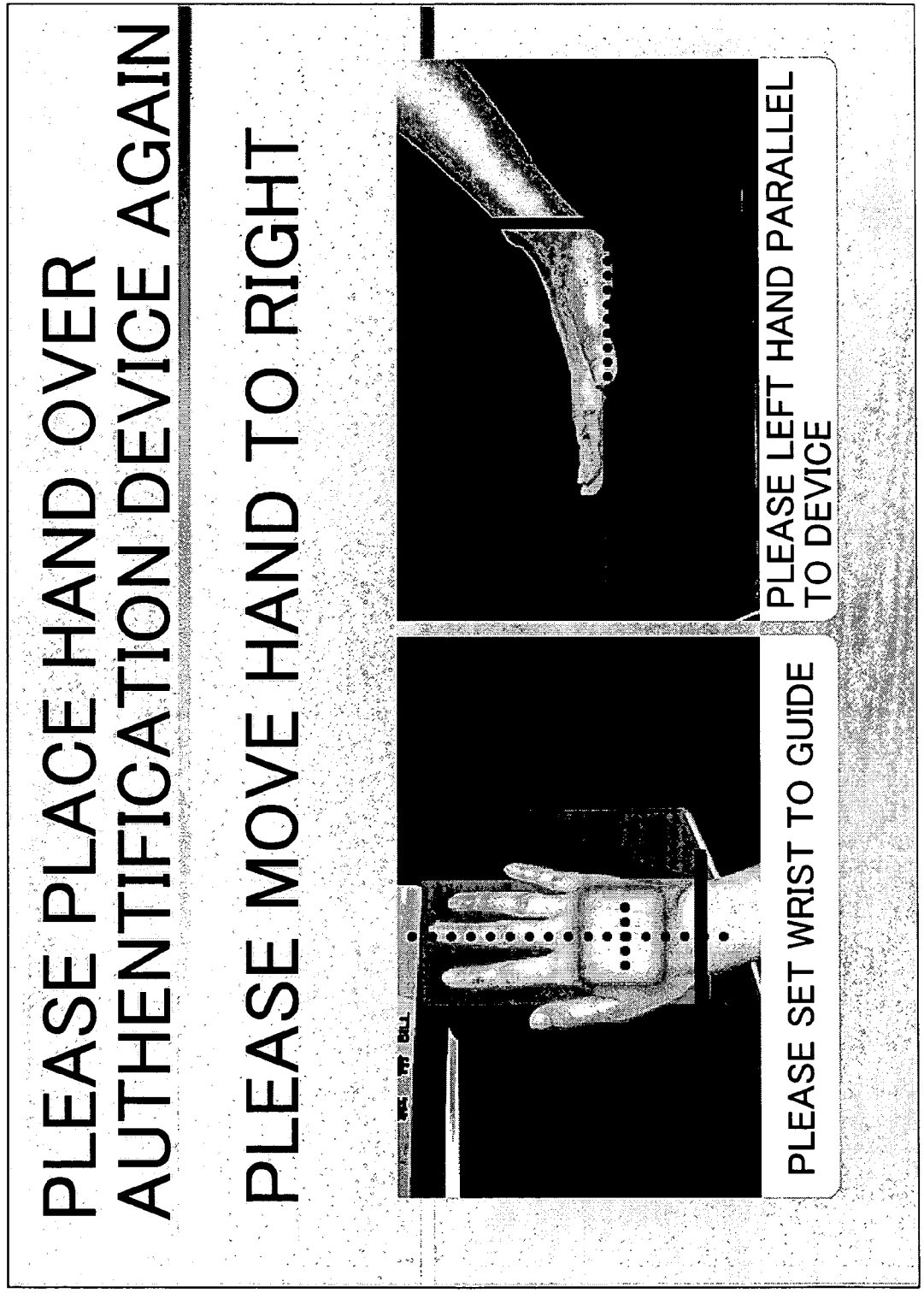
FIG. 24 explains an operation guidance screen image at the time of unsuccessful image capture in another embodiment of the invention.

FIG. 24 explains a guidance screen for another embodiment of the invention. In the above-described example of FIG. 19 through FIG. 21, forward/backward/left/right position shifts were together classified as position shifts to display guidance; in this example, rather than combining forward/backward/left/right position shifts, each is classified individually to display guidance. That is, here a guidance screen is shown for the case in which the hand is shifted to the left, with the text "Please move your hand to the right" and the images of FIG. 19 through FIG. 21.

In the above-described embodiment, non-contact biometrics authentication was explained for the case of palm vein pattern authentication; but application to authentication using finger vein patterns, palm-prints and other features of the hand, as well as to fingerprint, facial feature, and other biometrics authentication is also possible. The case of use of a non-contact sensor was explained, but application to contact-type sensors is also possible. Also, use in automated equipment for financial business was explained; but application to automated ticket dispensing machines, automated vending machines, and automated equipment in other fields, as well as to computers, the opening and closing of doors requiring individual authentication, use in place of keys, and other tasks is also possible.

Similarly, vein pattern registration can also be performed in the ATM 6, and registration patterns may be stored in a server or similar instead of IC cards.

In the above, embodiments of the invention have been explained, but various modifications can be made within the scope of the invention, and such modifications are not excluded from the scope of the invention.

A plurality of image capture operations (including distance measurement) are performed at short intervals, and when image capture NG occurs frequently these are stacked, and if after a prescribed number of image capture operations have still not been resolved, it is judged that the relation between body part and sensor must be corrected, the causes of the stacked image capture NGs are analyzed, and screen guidance for the relation between the body part and sensor is provided according to the analysis results.

Hence because guidance screens do not change frequently, the user can fully understand the cause of the problem and can change the position of the body part with respect to the sensor. As a result, confusion on the part of the user can be prevented, the body part can be moved quickly to an appropriate position and distance relative to the sensor, and the speed of authentication can be increased. Further, because the cause resulting in the greatest number of image capture NGs is selected and a screen indicating this cause is presented, causes resulting in only occasional image capture NGs can be excluded, and the user can be guided more reliably.

What is claimed is:

1. A biometrics authentication device, which captures an image of a body part, detects biometrics characteristic data from said captured image for biometrics individual authentication, comprising:
    an image capture device which captures an image of said body part;
    a display device which displays screens to guide a user in operating said image capture device; and
    a control unit which performs image capture operation of said image capture device, detects said biometrics characteristic data from captured images of said body part for biometrics authentification,
    and wherein said control unit judges, from the output of image capture operations of said image capture device, whether image capture has been successful, temporarily stores the cause of an unsuccessful image capture, and, when image capture is not successful even after image capture operation of said image capture device are executed a prescribed plural number of times, detects a most frequency cause among said temporarily stored plural causes, and displays a guidance screen corresponding to the detected most frequency cause on said display device.

2. The biometrics authentication device according to claim 1, wherein said control unit displays, on said display device, a guidance screen according to statistical information on said temporarily stored causes.

3. The biometrics authentication device according to claim 1, wherein said image capture device comprises:
    an image capture sensor; and
    a distance sensor which measures the distance from said body part,
    and wherein said control unit detects shifts in position between said image capture sensor and said body part as well as shifts in distance between said image capture sensor and said body part, and judges whether said image capture operation is successful.

4. The biometrics authentication device according to claim 3, wherein said control unit classifies the causes of unsuccessful image capture as said shifts in position or said shifts in distance, and selectively displays, on said display device, a guidance screen for a shift in position or a guidance screen for a shift in distance, according to a classification result.

5. The biometrics authentication device according to claim 1, wherein said control unit displays, on said display device, a screen indicating the order of operation of said image capture device prior to the initiation of said image capture.

6. The biometrics authentication device according to claim 1, wherein, when a verification result is not satisfactory, said control unit, after displaying on said display device a screen to repeat operation, initiates image capture operation of said image capture device.

7. The biometrics authentication device according to claim 1, wherein said image capture device has at least an image capture sensor, and wherein said control unit detects position shifts between said image capture sensor and said body part, judges whether said image capture operation is successful, classifies the cause of said image capture when not successful by direction of said position shift, and displays, on said display device, a guidance screen indicating the direction of position shift according to the result of a classification.

8. The biometrics authentication device according to claim 1, wherein the characteristic data of said body part is a blood vessel image pattern data of said body part.

9. The biometrics authentication device according to claim 1, wherein said control unit displays, as said guidance screens, text indicating the result of said analysis and an image indicating the appropriate positional relation of said body part to said image capture device.

10. A guidance screen control method of a biometrics authentication device which captures an image of body part and detects biometrics characteristic data from said captured image for biometrics authentication, comprising the steps of:
   judging, from output of image capture operation of an image capture device which captures the image of said body part, whether image capture has been successful;
   temporarily storing the cause of an unsuccessful image capture;
   detecting a most frequency cause among said temporarily stored plural causes when image capture is unsuccessful even after a plural prescribed number of image capture operations of said image capture device are executed; and
   displaying a guidance screen corresponding to the detected most frequency cause on display device.

11. The guidance screen control method of a biometrics authentication device according to claim 10, wherein said displaying step comprises a step of displaying, on said display device, a guidance screen according to statistical information on said temporarily stored causes.

12. The guidance screen control method of a biometrics authentication device according to claim 10, wherein said judging step comprises:
   a step of detecting position shifts between an image capture sensor of said image capture device and said body part and distance shifts between said image capture sensor and said body part, and
   a step of judging whether said image capture operation is successful from said detection result of said position shifts.

13. The guidance screen control method of a biometrics authentication device according to claim 12, wherein said step of detecting position shifts and distance shifts comprises a step of classifying said causes of unsuccessful image capture operations into said position shifts and said distance shifts,
   and wherein said displaying step comprises a step of selectively displaying a guidance screen for position shifts and a guidance screen for distance shifts, according to the result of a classification.

14. The guidance screen control method of a biometrics authentication device according to claim 10, further comprising a step of displaying, on said display device, a screen indicating the order of operation of said image capture device prior to an initiation of said image capture.

15. The guidance screen control method of a biometrics authentication device according to claim 10, further comprising:
   a step, when a verification result is not satisfactory, of displaying on said display device a screen to repeat operation; and
   a step of initiating image capture operation of said image capture device.

16. The guidance screen control method of a biometrics authentication device according to claim 10, wherein said judging step comprises a step of detecting a shift in position between an image capture sensor of said image capture device and said body part and of judging whether said image capture operation is successful,
   and wherein said detecting step comprises:
   a step of classifying causes of unsuccessful image capture operations by the direction of said position shifts; and
   a step of displaying, on said display device, a guidance screen indicating the direction of position shift, according to results of a classification.

17. The guidance screen control method of a biometrics authentication device according to claim 10, wherein said biometrics characteristic data is a blood vessel image pattern data of said body part.

18. The guidance screen control method of a biometrics authentication device according to claim 10, wherein said displaying step comprises a step of displaying, as said guidance screen, text indicating the result of said detecting and an image indicating the appropriate positional relation between said image capture device and said body part.

19. A computer-readable medium encoded with a program, causing a computer to execute the steps of:
   judging, from the output of image capture operation of an image capture device which captures the image of a body part, whether said image capture has been successful;
   temporarily storing the cause of an unsuccessful image capture;
   detecting a most frequency cause among said temporarily stored plural causes when image capture is unsuccessful even after a plural prescribed number of image capture operations of said image capture device are executed; and
   displaying a guidance screen corresponding to the detected most frequency cause on said display device.

20. The computer-readable medium encoded with a program according to claim 19, wherein, as said displaying step, said computer is caused to execute a step of displaying, on said display device, a guidance screen according to statistical information on said temporarily stored causes.

* * * * *